United States Patent
Conlon

(10) Patent No.: US 10,832,204 B2
(45) Date of Patent: Nov. 10, 2020

(54) TRACKING SYSTEM AND METHOD FOR MONITORING AND ENSURING SECURITY OF SHIPMENTS

(71) Applicant: Overhaul Group, Inc., West Lake Hills, TX (US)

(72) Inventor: Barry Conlon, Leander, TX (US)

(73) Assignee: Overhaul Group, Inc., West Lake Hills, TX (US)

( * ) Notice: Subject to any disclaimer, the term of this patent is extended or adjusted under 35 U.S.C. 154(b) by 84 days.

(21) Appl. No.: 16/054,996

(22) Filed: Aug. 3, 2018

(65) Prior Publication Data
US 2019/0066042 A1 Feb. 28, 2019

Related U.S. Application Data

(63) Continuation-in-part of application No. 15/156,318, filed on May 16, 2016, now Pat. No. 10,268,982.
(Continued)

(51) Int. Cl.
*G06Q 10/08* (2012.01)
*H04L 29/06* (2006.01)
(Continued)

(52) U.S. Cl.
CPC ........... *G06Q 10/0833* (2013.01); *H04K 3/00* (2013.01); *H04L 63/1416* (2013.01);
(Continued)

(58) Field of Classification Search
CPC ........ G06Q 10/00; G06Q 20/00; G06Q 30/00; G06Q 40/00
(Continued)

(56) References Cited

U.S. PATENT DOCUMENTS 7,937,244 B2 * 5/2011 Kadaba .............. G06K 19/0717
702/184
8,046,262 B1 * 10/2011 Antony .................. G06Q 10/08
705/26.1
(Continued)

OTHER PUBLICATIONS

Smith, "Information management of automatic data capture: An overview of technical developments", Information Management & Computer Security; 2002; 10, 2/3 Proquest p. 109 (Year: 2002).*
(Continued)

*Primary Examiner* — Frantzy Poinvil
(74) *Attorney, Agent, or Firm* — Isidore PLLC

(57) ABSTRACT

A system electronically tracks each or multiple shipment-related entities as a group of co-located dots that are monitored to provide enhanced security of the shipment from attacks or unauthorized or illicit actions that can compromise the shipment's safety. A data processing system (DPS) receives a plurality of location tracking signals of multiple shipment-related entities, associates the location tracking signals as a shipment group that is assigned a unique shipment tracking identifier (STID), and presents the shipment group as a plurality of co-located dots on a shipment tracking user interface (STUI). The DPS monitors for any unscheduled deviations in at least one of an expected co-location/geo-location of the location tracking signals, identifies specific types of unscheduled deviations, and triggers a series of responsive actions to protect the shipment. The unscheduled deviations can include signal jamming attacks, incorrect pickup (or theft) of an operator-assigned shipment, and unexpected separation of the tracked entities.

27 Claims, 14 Drawing Sheets

Related U.S. Application Data

(60) Provisional application No. 62/162,208, filed on May 15, 2015, provisional application No. 62/540,659, filed on Aug. 3, 2017.

(51) Int. Cl.
| | |
|---|---|
| *H04W 4/12* | (2009.01) |
| *H04K 3/00* | (2006.01) |
| *H04W 4/029* | (2018.01) |
| *G06F 3/0484* | (2013.01) |
| *H04W 4/08* | (2009.01) |
| *H04W 4/35* | (2018.01) |

(52) U.S. Cl.
CPC ...... *H04L 63/1425* (2013.01); *H04L 63/1466* (2013.01); *H04W 4/029* (2018.02); *H04W 4/12* (2013.01); *G06F 3/0484* (2013.01); *H04W 4/08* (2013.01); *H04W 4/35* (2018.02)

(58) Field of Classification Search
USPC ...................................................... 705/3–44
See application file for complete search history.

(56) References Cited

U.S. PATENT DOCUMENTS

| | | | | |
|---|---|---|---|---|
| 8,145,577 | B2 * | 3/2012 | Kodger, Jr. | G06Q 10/025 |
| | | | | 705/333 |
| 8,712,923 | B2 * | 4/2014 | Kadaba | B07C 3/00 |
| | | | | 705/333 |
| 8,924,312 | B2 * | 12/2014 | Kadaba | B07C 3/00 |
| | | | | 705/333 |
| 9,230,230 | B2 * | 1/2016 | Gupta | G06Q 10/08 |
| 9,710,740 | B2 * | 7/2017 | Morimoto | B65D 5/4212 |
| 9,798,998 | B2 * | 10/2017 | Kadaba | B07C 3/00 |
| 2002/0198774 | A1 * | 12/2002 | Weirich | G06Q 40/04 |
| | | | | 705/14.35 |
| 2013/0262336 | A1 * | 10/2013 | Wan | G06Q 10/0836 |
| | | | | 705/339 |
| 2015/0161697 | A1 | 6/2015 | Jones et al. | |
| 2015/0339902 | A1 | 11/2015 | Latorre | |
| 2015/0371185 | A1 | 12/2015 | Telang et al. | |
| 2016/0114976 | A1 * | 4/2016 | Gupta | G06Q 10/0836 |
| | | | | 700/232 |
| 2016/0335593 | A1 * | 11/2016 | Clarke | G06Q 10/0833 |
| 2017/0154302 | A1 * | 6/2017 | Streebin | G01G 19/005 |

OTHER PUBLICATIONS

Patent Cooperation Treaty, International Application No. PCT/US2018/045288, International Search Report and Written Opinion, dated Nov. 26, 2018.

\* cited by examiner

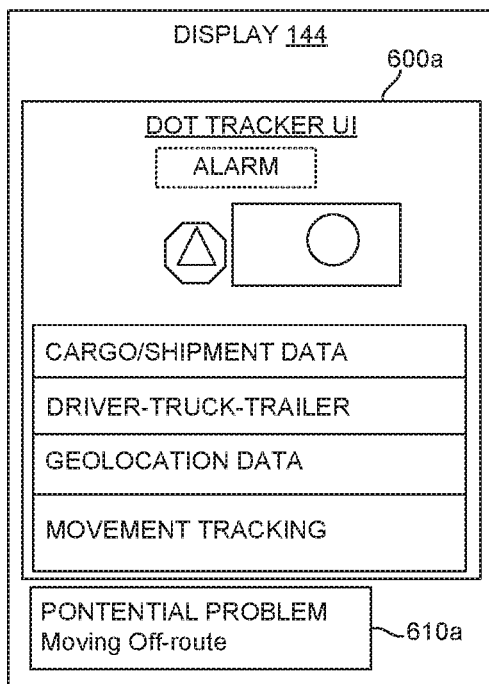
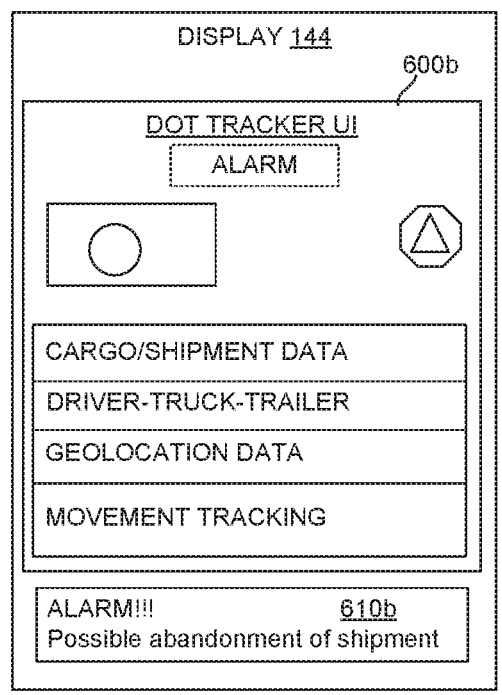
FIG. 6A
FIG. 6B
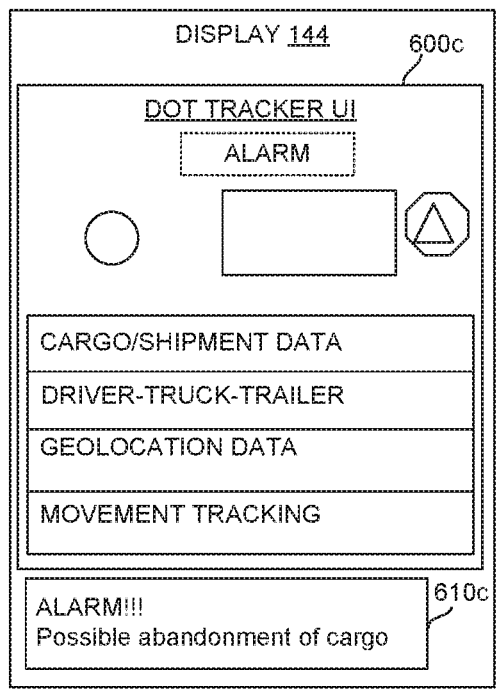
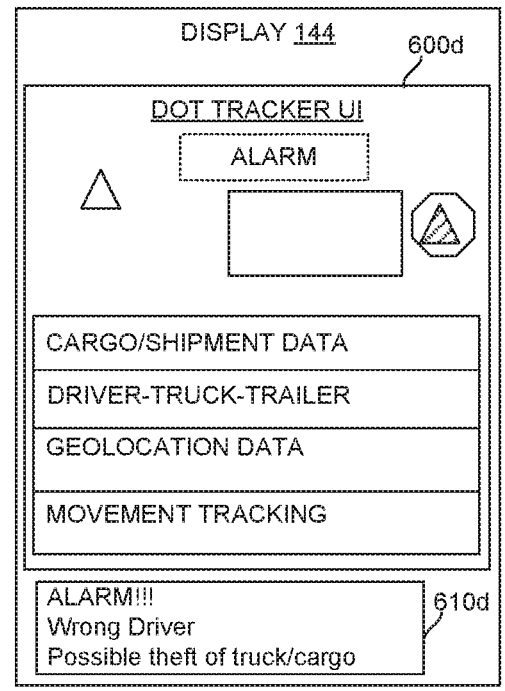
FIG. 6C
FIG. 6D

TRACKING SYSTEM AND METHOD FOR MONITORING AND ENSURING SECURITY OF SHIPMENTS

PRIORITY & RELATED APPLICATIONS

The present application is continuation-in-part of and claims priority from U.S. Utility application Ser. No. 15/156,318, filed on May 16, 2016, with priority date of May 15, 2015 (based on of U.S. provisional application No. 62/162,208, now U.S. patent Ser. No. 10/268,982 which was filed on said date). The application is also a conversion of and claims priority to Provisional Application No. 62/540,659, filed on Aug. 3, 2017. The entire content of each application is incorporated herein by reference, and priority to both applications is claimed for the associated sections of the present application.

BACKGROUND

1. Field of the Invention

The present disclosure is generally related to security systems and processes in the cargo transportation industry, and in particular to a method and system for monitoring the status and providing security of shipments via location-based tracking.

2. Description of the Related Art

Large quantities of cargo are transported daily across the continental US and in most other industrial countries, with transportation carriers. The use of tractor-trailers provided by the trucking industry accounts for a significant portion of the carriers utilized to transport these cargo, including those cargo that may eventually be transferred from the tractor-trailer and placed on an air transport of shipping vessel, or vice-versa. In the trucking industry, cargo are arranged to be transported from an origination point to a destination point via a particular tractor-trailer driven by an operator. The truckers (or truck drivers/operators) who provide the actual service of moving these cargo from origination to destination are often owner-operated truckers, whose sole purpose is to securely transmit the cargo from origination point to destination point and be paid for completion of that delivery.

Each shipped cargo is valuable to the parties involved in the shipment transaction, from the shipper, the brokerage service, the trucker (or truck driver/operator), and the recipient. Thus, the security of the cargo once the cargo leaves the origination/shipping point is of concern. With conventional trucking, the security aspects of the cargo have been primarily based on the operator being diligent in the field as the tractor-trailer is moved along a selected delivery route.

Unfortunately, the value of these cargo is often also of value to others not involved in the shipment, and who may desire to steal the cargo and/or the truck for various reasons, including financial or otherwise. Even a diligent operator is not be able to detect when activities are occurring in or around the shipment and the tractor-trailer or truck that negatively affects the shipment and/or jeopardizes or prevents the completion of the shipment delivery.

SUMMARY

The illustrative embodiments of the present disclosure provide a data processing system, a shipment security monitoring and tracking system, a method, and a mobile communication device for electronically tracking a shipment to provide enhanced security and safety of the shipment and counter against theft and other illicit actions, including jamming attacks. A system electronically tracks each or multiple shipment-related entities as a group of co-located dots that are monitored to provide enhanced security of the shipment from attacks or unauthorized or illicit actions that can compromise the shipment's safety. A data processing system (DPS) receives a plurality of location tracking signals of multiple shipment-related entities, associates the location tracking signals as a shipment group that is assigned a unique shipment tracking identifier (STID), and presents the shipment group as a plurality of co-located dots on a shipment tracking user interface (STUI). The DPS monitors for any unscheduled deviations in at least one of an expected co-location/geo-location of the location tracking signals, identifies specific types of unscheduled deviations, and triggers a series of responsive actions to protect the shipment. The unscheduled deviations can include signal jamming attacks, incorrect pickup (or theft) of an operator-assigned shipment, and unexpected separation of the tracked entities.

According to one embodiment, the DPS includes: a memory having stored thereon a shipment location tracking and security utility (SLTSU); a display device that enables visual presentation of at least one graphical user interface (UI) generated by the SLTSU; and at least one network interface device (NID) that enables the data processing system to receive and transmit information via one or more communication networks. The DPS further includes at least one processor coupled to the memory, the display device, and the at least one NID. The processor executes the SLTSU to enable the DPS to: receive, via the at least one NID, a plurality of location tracking signals indicating a location of multiple shipment-related entities that are being tracked concurrently as a shipment group. The DPS associates the location tracking signals as a shipment group and assigning a unique shipment tracking identifier (STID) to the shipment group to track movement of the location tracking signals relative to each other (and to a shipping route, in one embodiment). The DPS presents the shipment group as a plurality of co-located visual affordances on a shipment tracking user interface (UI), where each location tracking signal is represented by one visual affordance from among the plurality of co-located visual affordances. The DPS is further configured to monitor for any unscheduled deviations in at least one of an expected co-location and an expected geo-location of received updates to the location tracking signals within the shipment group. The DPS, in response to detecting an unscheduled deviation: identifies a specific type of the unscheduled deviation; and, based in part on the specific type of the unscheduled deviation identified, triggers a series of responsive actions to protect the shipment.

According to one aspect of the disclosure, the plurality of co-located visual affordances comprises a plurality of co-located dots, each dot representing a location of a shipment-related entity, as determined from a respective one of the received location signals. To monitor for any unscheduled deviations, the STLSU configures the DPS to detect an occurrence of an anomaly comprising one or more of (i) loss of reception of the location signals from one or more of the shipment-related entities, (ii) unscheduled changes in a spatial relationship of the shipment-related entities or corresponding visual affordances on the STUI, and (iii) a movement of a shipment dot from pick-up location before being co-located and grouped with operator dot, indicative of an unauthorized taking of the shipment. Further the DPS is configured to, in response to detecting an anomaly that includes an unscheduled separation of the co-located dots from each other before a shipment delivery at the intended destination, determine if there is a valid reason for the unscheduled separation by evaluating historical data and received data about the shipment-related entities, the route, geographic location at which the unscheduled separation occurs, and received environmental conditions. The DPS, in response to not identifying a valid reason for the unscheduled separation, flags the shipment for enhanced monitoring, triggers security measures to alert relevant parties of the occurrence of the anomaly, and creates and stores a record of the occurrence of the anomaly.

According to another aspect of the disclosure, the unscheduled deviation comprises a loss of a location signal of at least one shipment entity associated with a shipment group, and the STLSU configures the DPS to detect a complete loss of at least one location signal from a corresponding one or more of the shipment entities, and in response to the detected complete loss, remove or modify the visual affordance corresponding with the location signal for that shipment entity from the STUI. Further, the DPS determines, based in part on characteristics associated with the loss of the at least one signal, whether the loss is a result of a jamming attack at the location of the shipment. The DPS, in response to determining that the resulting loss is a result of a jamming attack, generates and issues a specific notification that identifies detection of the jamming attack and initiate one or more actions to counter the jamming attack and protect one or more of the shipment-related entities from bad act.

According to yet another aspect of the disclosure, the SLTSU configures the DPS to identify an intended (authorized) operator and shipping vessel assigned to a future shipment awaiting pickup by the intended operator, the intended operator having an operator ID and a communication device that provides a unique device location signal that is associated with the operator ID, the shipment also having a unique shipment location signal; and associate the operator ID to the future shipment. The DPS is further configured to monitor a geo-coordinate location of the future shipment prior to pick-up by the operator, and in response to receiving a signal indicating the operator has picked-up the shipment, link and co-locate the unique device location signal and unique shipment location signal to create and track a new shipment group. The data processing system is further configured to identify an anomaly from among: (i) detecting a change in the geo-coordinate location of the shipment by more than a first threshold distance prior to the unique shipment tracking signal being co-located with the unique device location signal; and (ii) detecting that a second operator device signal, different from the unique device location signal, is co-located with and begins to move in unison with the unique shipment tracking signal, where the second operator device signal is not associated with the operator or a second operator that has been assigned to transport the shipment. The DPS, in response to identifying the anomaly, triggers a series of responsive actions designed to prevent or stop an un-authorized operator from taking the shipment.

According to another embodiment, a method includes: receiving, at a computing device, a plurality of location signals, each location signal indicating a location of one of multiple geographically-co-located entities that are being tracked concurrently as a shipment group associated with a specific shipment; associating the location tracking signals as a shipment group and assigning a unique shipment tracking identifier (STID) to the shipment group to track movement of the location tracking signals relative to each other and to a shipping route; and presenting the shipment group as a plurality of co-located visual affordances on a shipment tracking user interface (UI). The method further includes monitoring for any unscheduled deviations in at least one of an expected co-location and an expected geo-location of received updates to the location tracking signals within the shipment group. The method also includes, in response to detecting an unscheduled deviation, identifying a specific type of the unscheduled deviation and triggering a series of responsive actions based on the specific type of the unscheduled deviation.

As another aspect of the disclosure, a method includes monitoring a relative location of an operator to a shipment via a plurality of sensor signals received for shipment-related entities of a shipment group. The method further includes detecting a separation of at least one of (i) an operator signal from a trailer/tractor signal, (ii) a shipment signal from the trailer/tractor signal; and (iii) the operator signal from the shipment signal. The method also includes, in response to the separation being greater than a pre-established, acceptable separation distance, generating and issuing a notification that informs a recipient of an occurrence of the detected separation, which is greater than the pre-established acceptable separation distance.

According to one aspect, an operator's mobile communication device (MCD) includes a processor that executes a shipment location tracking utility that enables the device to present, within a user interface, a group of dots representing a relative co-location of each of the cargo and the tractor trailer; automatically update a relative location of each dot within the group to correlate to a current real-time location; detect an unscheduled separation of the dots. The MCD also compares a separation distance to a pre-set threshold maximum separation distance and determines when a detected separation distance of one of the tracking affordances is greater than the pre-set threshold maximum separation distance. In response to the separation distance being greater than the pre-set threshold maximum separation distance, the MCD generates and issues a notification signal to alert at least one of the operator and a remote monitoring device that an anomaly has been detected with the movement of the shipment that can affect a security of the shipment.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE FIGURES

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIGS. 5A-5D and 6A-6D respectively illustrates example dots tracking user interfaces that present a focused view of co-located shipment-related entities of a particular shipment being monitored, including warnings/notifications identifying any anomalies occurring with the shipment, according to one or more embodiments;

DESCRIPTION OF ILLUSTRATIVE EMBODIMENTS

Figure 1A:
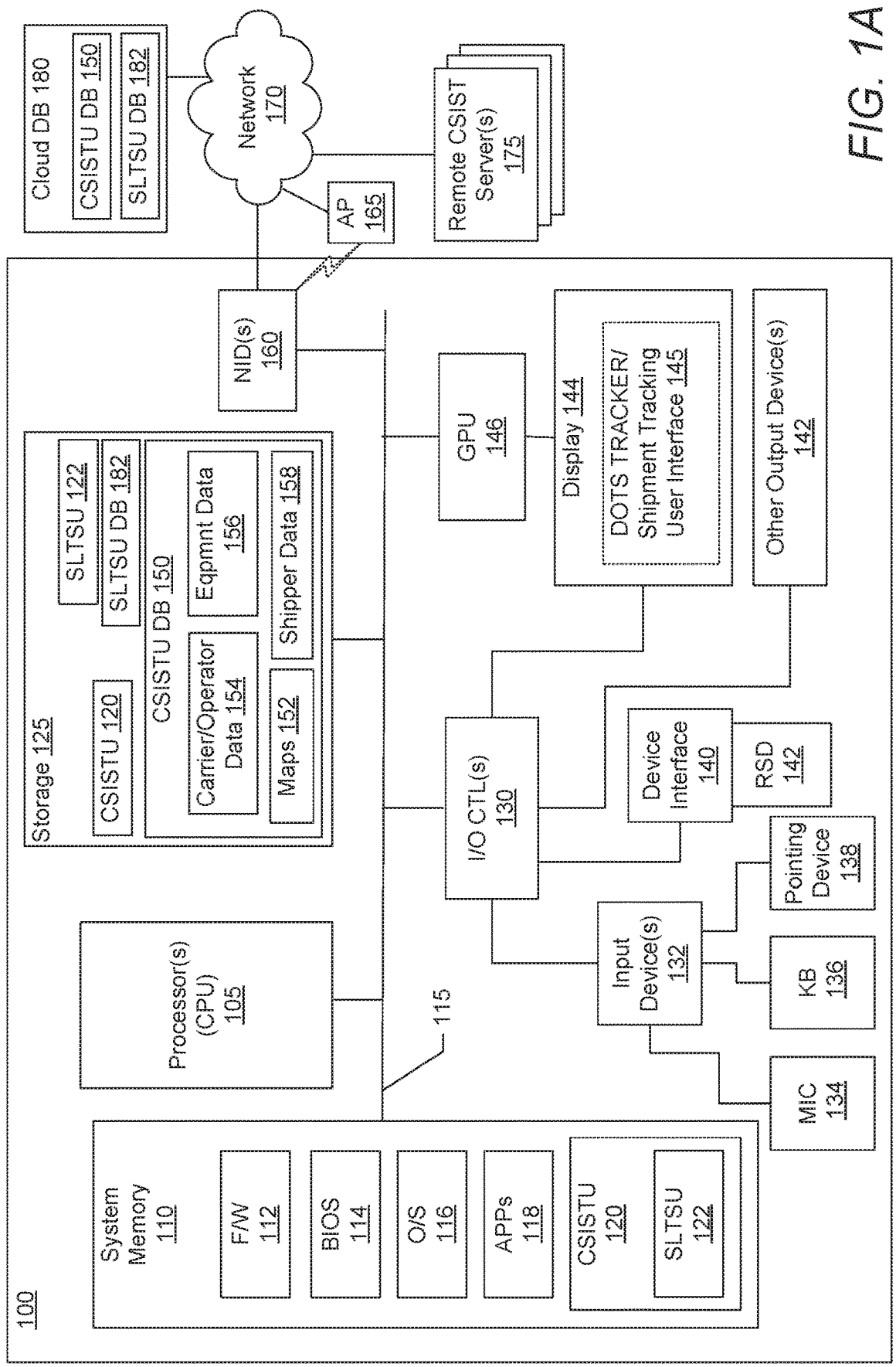
FIG. 1A illustrates an example data processing system (DPS) within which various aspects of a shipment location tracking and security system can be implemented, in accordance with one or more embodiments.

According to one or more aspects, the illustrative embodiments of the present disclosure provide a data processing system, a shipment security monitoring and tracking system, a method, and a mobile communication device for electronically tracking a shipment to provide enhanced security and safety of the shipment and counter against theft and other illicit actions, including jamming attacks. A system electronically tracks each or multiple shipment-related entities as a group of co-located dots that are monitored to provide enhanced security of the shipment from attacks or unauthorized or illicit actions that can compromise the shipment's safety. A data processing system (DPS) receives a plurality of location tracking signals of multiple shipment-related entities, associates the location tracking signals as a shipment group that is assigned a unique shipment tracking identifier (STID), and presents the shipment group as a plurality of co-located dots on a shipment tracking user interface (STUI). The DPS monitors for any unscheduled deviations in at least one of an expected co-location/geo-location of the location tracking signals, identifies specific types of unscheduled deviations, and triggers a series of responsive actions to protect the shipment. The unscheduled deviations can include signal jamming attacks, incorrect pickup (or theft) of an operator-assigned shipment, and unexpected separation of the tracked entities.

Generally, the illustrative embodiments further provide for different forms and methods of dot-based, automated tracking of shipments, with computer-based detection of abnormalities in the movement of the co-located dots and subsequent response to the detected abnormalities by automatic computer-based generation of one or more notifications and/or triggering of responsive actions. As a first aspect, one implementation of the disclosure generally provides security tracking of a shipment by presenting and monitoring the movement of multiple co-located dots, with each dot representing one of multiple shipment-related entities. The movement of the co-located dots are then analyzed to enable detection of potential bad act towards the shipping vehicle/vessel and/or the shipment or cargo, such as abandonment of a shipment by the operator/driver, as one application. Other applications of the disclosure provide embodiments for generation of real-time alerts and/or notification of potential theft of cargo and/or a transportation vehicle, such as a tractor-trailer, where the theft is being facilitated by signal jamming attacks or location sensor tampering.

The disclosure expands on the use of systems for tracking a location of one or more shipment-related entities involved in the shipment of a cargo. For example, to track the location of a cargo and/or a tractor-trailer, a location tracking device (such as a transponder) can be attached to the entity being tracked, in one embodiment. The location tracking device wirelessly communicates a location signal indicating a geographic location of the tracked entity. The location of a single entity associated with the shipment can then be tracked via a single dot on a tracking/monitoring computer that receives the geographic signals from the location tracking device.

In conventional shipments that include a single transponder to track the location of a shipment and/or the tractor-trailer, thieves and others who intend to take or otherwise interfere with the cargo/shipment or the tractor-trailer have resorted to utilizing jamming techniques to block the outbound signals of the transponders. Once the signals are blocked, the thief can then proceed to remove the cargo from the tractor-trailer or steal the tractor and/or trailer or the combination thereof with the cargo, knowing that the location of the shipment can no longer be traced. By using this jamming attack on the transponder signal, no wireless trace is transmitted for the monitoring computer to later detect the location of the stolen items, when the theft is later discovered. By the time the theft is discovered, the thief is likely long gone with the shipment. The present disclosure addresses this use of signal jamming by providing a monitoring system that quickly identifies when the signal jamming attack has been initiated and a responsive system to notify the relevant parties to respond to and prevent the theft of the cargo or container.

Additionally, a cargo or a trailer containing cargo is occasionally assigned by a shipper for pick up by a selected/authorized driver/operator from a pick-up point, such as a cargo on-loading dock. There are occasions when the cargo or trailer is deliberately or inadvertently hitched to the vehicle (e.g., a truck) of another operator and taken away from the pick-up point by the incorrect/unauthorized operator. When the correct/authorized operator arrives, there is no cargo/trailer to pick up, and the un-authorized operator may be long gone with the shipment. The shipper and other associated/interested parties are forced to deal with a loss of the shipment, with a resulting loss in time and/or financial loss, particularly if the cargo or trailer was deliberately taken by the unauthorized operator and is not recovered. Again, aspects of the disclosure address each of the above scenarios and provides a solution that enables early detection of these activities and triggered notifications and responses that mitigate the effects of the specific activity detected.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Within the description of the features of the disclosure and the accompanying drawings, the embodiments are presented from the perspective of a trucking based shipping model, where the term "carriers" is provided to refer to (i) an owner-operator with a single equipment, (ii) an owner-operator or small business owner with several trucks, and who can employ multiple drivers, and (iii) a large commercial organization/company that includes a large number of trucks, e.g., hundreds of trucks and drivers. Additionally, the term "equipment" generally refers to the combination of "tractor and trailer", and covers the various different types of equipment available, including, but not limited to, flatbeds, dry vans, refrigerated trucks, etc. According to one embodiment, the relevant details of the equipment that is tracked includes the type of equipment as well as the available capacity of the specific equipment to load additional cargo. It is appreciated that, while specific types of cargo hauling trucks fall within the term equipment, the term equipment can also apply to different types of trucks or motor vehicles, without limitation. Additionally, the underlying features of the disclosure are fully applicable to other transportation and/or shipping spaces, such as water-based shipping (e.g., ocean cargo or river cargo), where carriers are boat owners carriers or cargo ship captains, the equipment are the water vessels or amphibious vessels, and the shipper can be any registered person or business that has a cargo that can be transported over water from a cargo pick-up point to a delivery destination by a carrier. Air based transportation is also a supported space that can include a framework designed for interfacing by air-based cargo shippers and pilots with planes, etc. It is further foreseeable that the functionality of the presented framework/environment can be extended to a transportation space involving drone shipments, for example, where the drone operators (pilots) are not co-located with the drone equipment.

For simplicity and to present best mode embodiments, the disclosure is described from the perspective of a shipment that is being transported by a tractor-trailer combination as common in the trucking industry, where the carrier is a trucker and the equipment is a truck or tractor (an on-land motor vehicles) to which a trailer or container is hitched. It is understood that the features and functionality described herein can also be applicable to different types of on-land motorized equipment, such as cars, RVs, busses, motorcycles, and the like, without limitation. Extension to bicycles and other non-motorized form of transportation can also be applicable.

Certain coined terms are utilized herein in describing the features and functionality of the disclosure. For example, the term "shipment-related entity" is utilized to reference each of the following, without limitation: a cargo, a cargo container, a tractor (e.g., a motorized vehicle), a trailer or container, a tractor-trailer as a combined operator equipment, an operator, an operator mobile device. Each shipment-related entity has a separate location tracking mechanism that enables the geographic location of the entity to be determined. In one or more embodiments, the location tracking mechanism is a transponder. The location tracking mechanism provides a unique location signal for the particular shipment-related entity. The term "shipment group" generally represents any two or more of the shipment-related entities that are assigned to a same shipment. Entities in a shipment group are expected to be physically co-located while the shipment is being delivered. Certain limited exceptions or deviations to the co-location of one or more of the entities is anticipated and accounted for by the algorithm provided herein. The grouping of entities is expected to be within a specific range/radius of each other and to move in the same direction as each other, with some limited exceptions (e.g., when a truck driver/operator leaves the truck/tractor-trailer at a truck stop or at a shipment pickup or drop-off location).

Throughout the description, references made to the term shipment refers primarily to the cargo that is being carrier from an origination point to a delivery destination. Other terms utilized throughout the disclosure are provided with functional descriptive names that represent the meanings and/or the context in which the terms are presented and/or utilized.

The attached figures present various aspects and/or features of the described embodiments; however, certain features may not be expressly presented within the figures and/or the description thereof. Within the descriptions of the different views of the figures, similar elements are provided similar names and reference numerals as those of the previous figure(s). The description of the illustrative embodiments are therefore be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

Those of ordinary skill in the art will appreciate that the hardware, firmware/software utility, and software components and basic configuration thereof depicted in the following figures may vary. For example, the illustrative components of data processing system 100 (FIG. 1A) and mobile communication device 1000 (FIG. 10) are not intended to be exhaustive, but rather are representative to highlight some of the components that are utilized to implement certain of the described embodiments. For example, different configurations of either computer device 100 or user mobile communication device 1000 may be provided, containing other devices/components, which may be used in addition to or in place of the hardware depicted and/or described, and may be differently configured. The depicted examples are therefore not meant to imply architectural or other limitations with respect to the presently described embodiments and/or the general innovation.

Referring now to the figures, and beginning with FIG. 1A, there is illustrated an example server data processing system (DPS) 100 within which can be implemented various aspects of the disclosure and in particular cargo/shipment tracking, with detection and notification of potential abnormalities that can be indicative of bad act, in accordance with one or more embodiments. In one embodiment, DPS 100 can be one sever within a cluster of servers, where the servers can be co-located in a single location and/or geographically dispersed over a plurality of locations. In other embodiments, DPS 100 can be any electronic device such as, but not limited to, a desktop computer, notebook computer, or a single server. Additionally, in one embodiment, DPS 100 can be implemented as a virtual machine sharing hardware resources of a physical server. In one embodiment, DPS 100 operates as a networked computing device providing a cloud infrastructure that supports implementation of a carrier and shipper interfacing and shipment tracking (CSIST) framework. Generally, DPS 100 can operate as both a data aggregator and/or a monitoring center computer. As a data aggregator, DPS 100 receives additional amounts of information from shipment-related entities to enable other features and functionalities, included those described within the parent application. As a monitoring center computer, DPS 100 can be configured with additional methods and components for generating notifications and responding to detected conditions.

Example DPS 100 includes at least one processor, and potentially a plurality of processors, generally referenced hereinafter as central processing unit (CPU) 105. CPU 105 is coupled to system memory 110, non-volatile storage 125, and input/output (I/O) controllers 130 via system interconnect 115. System interconnect 115 can be interchangeably referred to as a system bus, in one or more embodiments. One or more software and/or firmware modules can be loaded into system memory 110 (from storage 125 or other source) during operation of DPS 100. Specifically, in the illustrative embodiment, system memory 110 is shown having therein a plurality of software/firmware modules, including firmware (F/W) 112, basic input/output system (BIOS) 114, operating system (OS) 116, and application(s) 118. Additionally, system memory 110 includes CSIST utility (CSISTU) 120, which includes shipment location tracking and security utility (SLTSU) 122. While shown as a separate module, CSISTU 120 can, in alternate embodiments, be provided as one of applications 118 and/or as an executable component within F/W 112 or OS 116. Additionally, while presented as a module within CSISTU 120, SLTSU 122 can be a separate, stand-alone module, in alternate embodiments and can be executed independent of (i.e., without requiring the concurrent execution of) CSISTU 120. The software and/or firmware modules within system memory 110 enable DPS 100 to provide varying features and functionality when their corresponding program code is executed by CPU 105 or by secondary processing devices (not specifically shown) within DPS 100.

I/O controllers 130 support connection by and processing of signals from one or more connected input device(s) 132, of which microphone 134, keyboard 136, and pointing/touch device 138 are illustrated, by way of example. Pointing/touch device 138 can be a mouse or a touch pad, or stylus, for example. It is appreciated that input devices can also include, as a non-exclusive list, hardware button(s), touch screen 146, infrared (IR) sensor, a fingerprint scanner, and the like. I/O controllers 130 also support connection with and forwarding of output signals to one or more connected output devices, including display 144 and other output devices 148. Display 144 can include a touch screen 146 that serves as a tactile input device. In one embodiment, DPS 100 also includes a graphics processing unit (GPU) 146, which is communicatively (or physically) coupled to display 144 and to processor 105. GPU 146 controls the generation and presentation of certain user interfaces (UIs) that are created during execution of CSISTU 120 and/or SLTSU 122 by CPU 105. As a specific embodiment, and as described in greater detail below, SLTSU 122 generates shipment tracking user interface (STUI) 145, which is presented on display 144 and on which a grouping of co-located signal dots are presented and monitored for detection of security breaches with the associated shipment. In one or more embodiments, STUI 145 can also be interchangeably referred to herein as a DOTS tracker UI, which describes the base functions provided by STUI 145 of co-locating and tracking the dots assigned to the shipment-related entities in a shipment group.

Figure 1B:
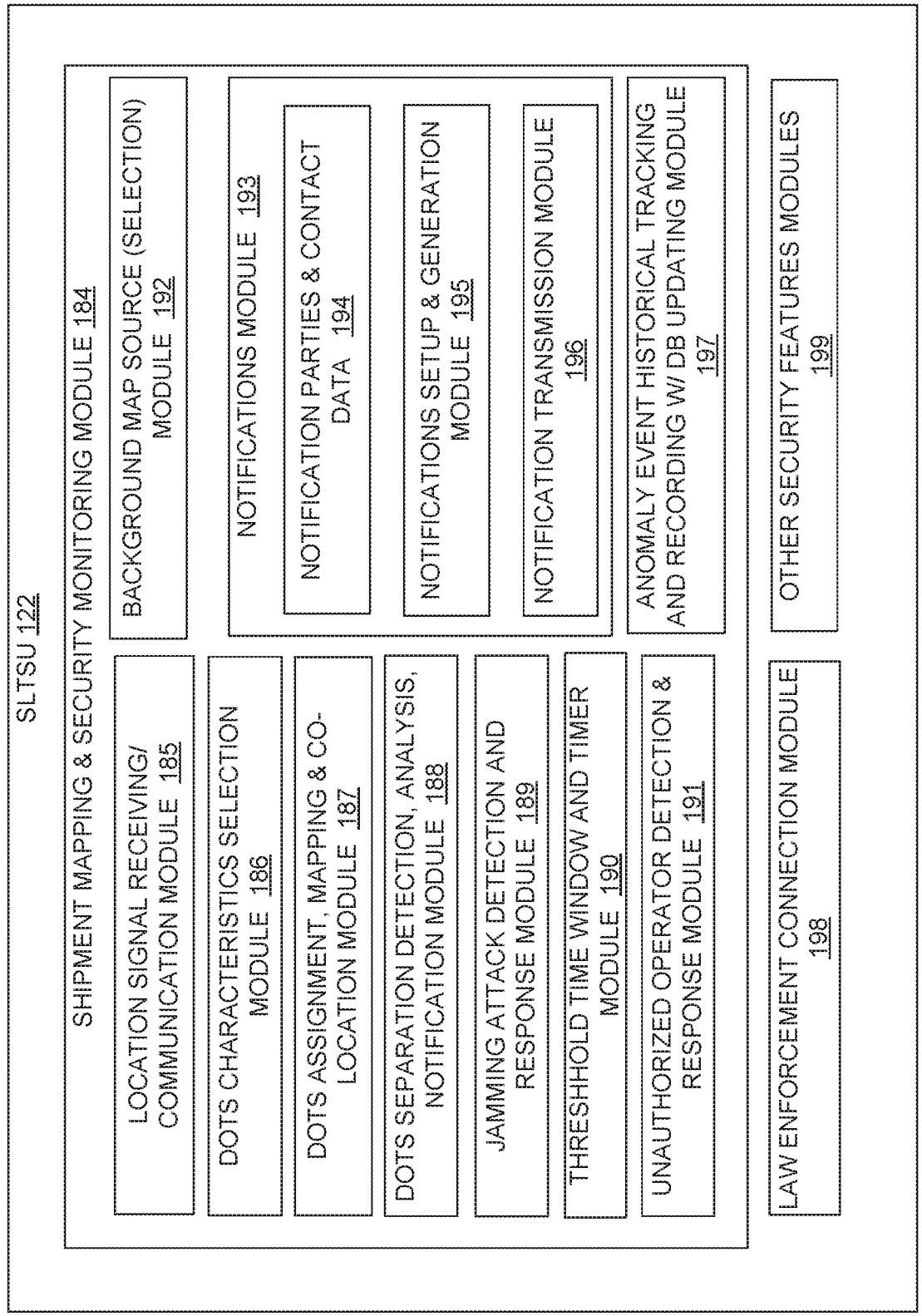
FIG. 1B provides a block diagram representation of example functional modules that support the various different features provided by a shipment location tracking and security utility (SLTSU) within the DPS of FIG. 1A, in accordance with one or more embodiments.

FIG. 1B provides a block diagram representation of some of the functional (software) modules that performs the various features and operations of SLTSU 122 when executed by processor 105. Included within SLTSU 122 is a shipment mapping and security monitoring module 184, which in turn includes, without limitation, locations signal receiving/communication module 185, dots characteristics selection module 186, dots assignment, mapping and co-location module 187, dots separation detection, analysis, notification module 188, jamming attack detection and response module 189, threshold time window and timer module 190, on authorized operator detection and response module 191, background map source (select) module 192, notifications module 193, and anomaly event historical tracking and recording module 197, which provides database updating features. Within notifications module 193 are notification parties and contact data 194, notifications set up and generation module 195, and notification transmission module 196. It is appreciated that the functions performed by one or more of the module may overlap and that the presentation of specific modules with specific, functionally-descriptive names applied to the modules is not intended to in any way limit or define the actual makeup of SLTSU 122, in other embodiments. In addition to the modules within shipment mapping and security monitoring module 184, SLTSU 122 also includes law enforcement connection module 198 and other security features modules 199, which serves as a general catch-all for the other modules possible within STLSU 122.

Referring again to FIG. 1A, in one or more embodiments, one or more device interfaces 140, such as an optical reader, a universal serial bus (USB), a card reader, Personal Computer Memory Card International Association (PCMIA) slot, and/or a high-definition multimedia interface (HDMI), can be associated with DPS 100. Device interface(s) 140 can be utilized to enable data to be read from or stored to corresponding removable storage device(s) (RSD) 142, such as a compact disk (CD), digital video disk (DVD), flash drive, or flash memory card. In one or more embodiments, device interfaces 140 can further include General Purpose I/O interfaces, such as Inter-Integrated Circuit ($I^2C$), System Management Bus (SMBus), and peripheral component interconnect (PCI) buses. In accordance with one embodiment, the functional modules (e.g., SLTSU 122) described herein and the various aspects of the disclosure can be provided as a computer program product. The computer program product includes removable storage device(s) 142 as a computer readable storage medium, on which is stored program code when executed by a processor causes the processor to implement the various functions described herein, including, but not limited to, the features presented in the flow charts of FIGS. 7, 8A, 8B, and 9.

DPS 100 further includes network interface device (NID) 160, which can include both wired and wireless networking devices (not specifically shown). NID 160 enables DPS 100 and/or components within DPS 100 to communicate and/or interface with other devices, services, and components that are located external to DPS 100. In one embodiment, DPS 100 may directly connect to one or more of these external devices, via NID 160, such as via a direct wire or wireless connection. In one or more embodiments, DPS 100 connects to specific external devices, services, and/or components, such as information server(s) 175 and cloud database (DB) 180, via external network 170, using one or more communication protocols. In the illustrative embodiment, cloud DB 180 includes respective data storage for CSISTU and SLTSU, namely CSISTU DB 151 and SLTSU DB 182. Network 170 can be a local area network, wide area network, personal area network, and the like, and the connection to and/or between network 170 and DPS 100 can be wired or wireless (via access point 165) or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet. In one embodiment, CSISTU 120 provides an interactive framework that is accessible via the Internet (170) as a website having one or more domain names affiliated therewith.

As one aspect of the disclosure, CSISTU 120 and SLTSU 122 include a plurality of functional modules that execute on CPU 105 to perform specific functions, and these functional modules utilize and/or generate specific data, which data is stored as information and/or data within storage 125 and/or within cloud database 180. As an example, storage 125 is shown to include CSISTU 120 and CSISTU DB 150, which includes different blocks of data, including Maps 152, carrier and operator data 154, equipment data 156, and shipper data 158. Also, cloud database 180 is shown to include a copy of CSIST DB 150. Both locally-stored and remotely-stored CSISTU DBs 150 store relevant data utilized by CSISTU 120 to perform the personalization of certain UIs and locating of tractor-trailers and/or shipments on a displayed map. Access to the CSIST DB 151 at remote, cloud DB 180 is provided via the connection through network 170.

Similarly, storage 125 also includes a copy of SLTSU 122 and SLTSU DB 182. Also, both locally-stored and remotely-stored SLTSU DBs 182 store relevant data utilized by SLTSU 122 to perform the dots mapping and the monitoring for and identifying security breaches and other notification features described herein. In one or more embodiments, SLTSU DB 182 contains historical data about previous shipments, including environmental and other events, such as detected anomalies/deviations in co-location and movement of the dots that correspond to certain types of security breaches. SLTSU DB 182 also contains information about the notifications and other responsive actions that resulted in successful resolution of detected anomalies/deviations and/or confirmed security breaches.

Figure 2:
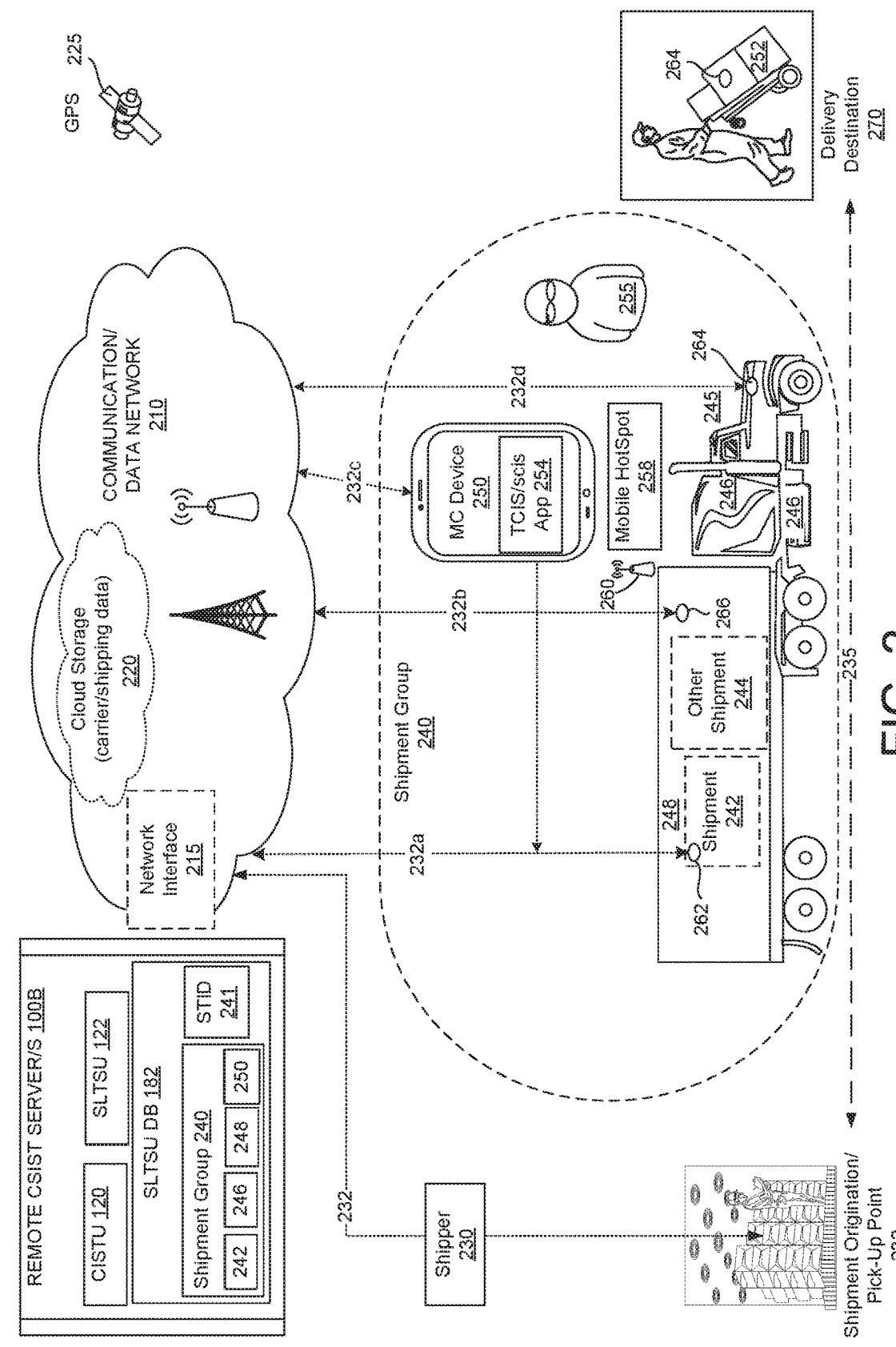
FIG. 2 illustrates an example shipment tracking communication environment that includes shipment-related entities configured with location tracking devices that communicate location signals to a monitoring computer via a communication network, according to one or more embodiments.

FIG. 2 illustrates an example communication infrastructure (or communication network environment) 200 that extends the functionality of a CSIST framework to enable the various features and functionality provided by the disclosure. These features and functionality include, but are not limited to, enabling dots-based location tracking of shipment-related entities, monitoring for anomalies indicative of a potential security breach, and identifying the types of anomalies based on changes in the location signals received via communication infrastructure 200 from the different shipment-related entities, according to one or more embodiments. Communication infrastructure 200 generally includes data processing system (remote CSIST server) 100B within which is provided SLTSU 122 and an associated SLTSU DB 182. SLTSU DB 182 is shown to include an example shipment group 140, which includes four shipment-related entities 242, 246, 248, 250. Shipment group 140 has been assigned a unique shipment tracking identifier (STID) 241 by SLTSU 122.

Communication infrastructure 200 also includes communication/data network 210 (which can be synonymous with network 170). Communication/data network 210 includes a plurality of communication devices and subnetworks that enable voice, data, and other forms of communication. Communication/data network 210 supports transmission of wirelessly communicated signals via intermediary receiving devices, such as antennas and access points. Communication/data network 210 also includes cloud storage 220 for storing relevant carrier and shipping data and other historical data utilized by SLTSU 122. Network interface 215 enables communication of location signals and other data and/or information between data processing system 100 and communication/data network 210. Communication infrastructure 200 further includes global position satellite (GPS) 225 as an example of one technology for determining a current geographical location of a shipment-related entity, as described herein. Communication infrastructure 200 includes a communication link 232 with shipper 230, who manages shipment of cargo 242 from shipment origination point 232. The cargo (or shipment) 242 is transported as a part of a shipment group 240 to shipment delivery destination 270 via a shipping route 235.

Communication infrastructure 200 further includes a plurality of communication links 232a-232d each providing location signals transmitted from (or for) a corresponding shipment-related entity within shipment group 240. As illustrated within communication infrastructure 200, shipment group 240 is generally comprised of shipment/cargo 242, tractor-trailer equipment 245 collectively, operator 255 and operator communication device 250(s), each having a location tracking mechanism for providing a unique location signal that is communicated to data processing system 100 via network 210. In one alternate embodiment, each of tractor (vehicle) 246 and trailer (container) 248 are equipped with separate location tracking mechanism, such that each can be tracked separately.

As shown, location tracking mechanism 262 of shipment 242 transmits first location signal 232a to network 210, location tracking mechanism 266 of trailer/container 248 transmits second location signal 232b to network 210, location tracking mechanism 266 of operator's mobile communication device 240 transmits third location signal 232c to network 210, and location tracking mechanism 264 of tractor/truck 246 transmits fourth location signal 232b to network 210. In one embodiment, the location tracking mechanism placed on/in one or more of the shipment-related entities is a transponder that transmits a unique transponder signal. In other embodiments, the location tracking mechanism can be a more sophisticated device, as is generally known to those skilled in the art. For example, the operator's mobile communication device can rely on cell tower triangulation for location detection or GPS-based location detection.

Figure 10:
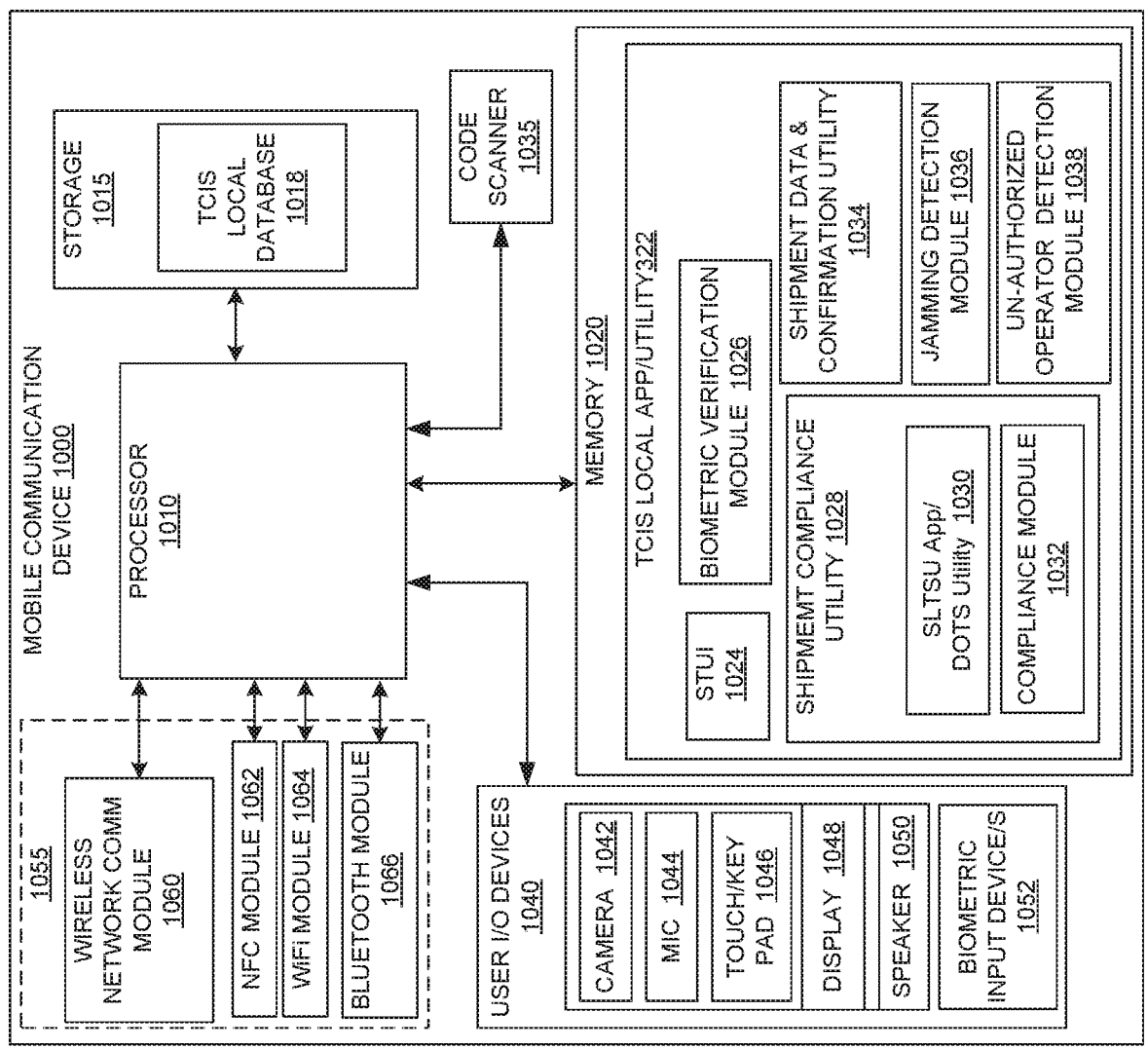
FIG. 10 illustrates an example mobile communication device utilized by an operator/driver and which is equipped with a DOTS tracking app to enable real-time tracking of the shipment group and receipt of notification of potential problems occurring with the shipment group, in accordance with one or more embodiments.
Figure 10:
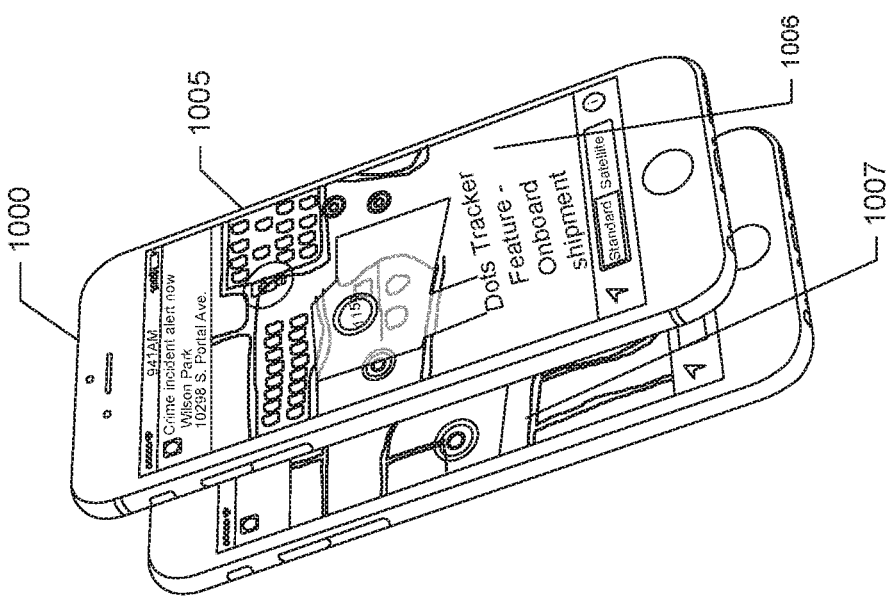

As illustrated, the operator's mobile communication device 250 is configured with one or more applications, including shipment location tracking, dots generation and tracking app, which enables the localized tracking of the shipment 242 and tractor-trailer 245 by operator, as described in greater detail within the description of FIG. 10.

According to one or more embodiments, location transponder 262 of shipment 242 can be attached to either the exterior or interior of the case or packaging for that shipment 242 or on the cargo itself. According to one or more embodiments, data is accumulated from a plurality of transponders, and the collected transponder signals/data are transmitted back to CSIST server 100. In one embodiment, all of the transponder data is forwarded to a single collection point within tractor-trailer 245, and the collected data is compiled utilizing a proprietary compilation method and forwarded via a proprietary protocol for processing via CSIST utility 120 and/or SLTSU 122. In one embodiment, the transponder is a part of a sensor system that captures different information about or associated with the shipment, including but not limited to: real time positioning; cargo environment, such as temperature and humidity; event occurrence; motion, intrusion, and other activities affecting cargo. In one embodiment, operator equipment (i.e., tractor-trailer 245) includes a mobile hotspot 260 that enables communication from operator equipment (245) back to CSIST server 10B via communication network 210.

Communication infrastructure 200 enables efficient communication with carriers or operators and supports the monitoring and tracking of the various shipment-related entities within shipment group 240. In one embodiment, communication infrastructure 200 is also configured to receive real-time or projected information about the environment, such as weather conditions, along the route 235 that can affect the security of the equipment and/or the cargo, according to one embodiment.

As one aspect, the shipment tracking system of a CSIST framework also provide various types of information about the carriers, operators, trailer-tractor equipment, and shipping routes to facilitate shipper selection of specific carriers for transporting specific shipments, using a selection process for identifying and selecting a best operator and equipment for a particular shipment based on the carrier profiles and other received external inputs. In one embodiment, one important data utilized in selecting the carrier/operator/equipment is inclusion of a location transponder on the tractor-trailer and location tracking capability for the operator's mobile communication device 250. While not shown, it is contemplated that, in one embodiment, operator 255 can also be provided with a separate transponder to enable a location of operator to be ascertained relative to the shipment, for instances in which operator 255 may leave his mobile communication device 250 inside the tractor or at another location, separate from operator's location. The level of security required for a particular shipment may necessitate the operator 255 agree to wear a tracking device while transporting the shipment.

In another embodiment, as a security measure, the operator's mobile communication device is configured to require a biometric input and a login via the biometric input is required prior to accepting the shipment and at each point when the operator stops the equipment along the route. This prevents another person from being able to drive off with the shipment by stealing the operator's MCD 250. Additional security measures may be tied to the equipment, including being able to remotely shut off the engine of the tractor when a theft of equipment has been verified and/or the operator does not to provide the biometric confirmation within a provided time period.

Figure 3A:
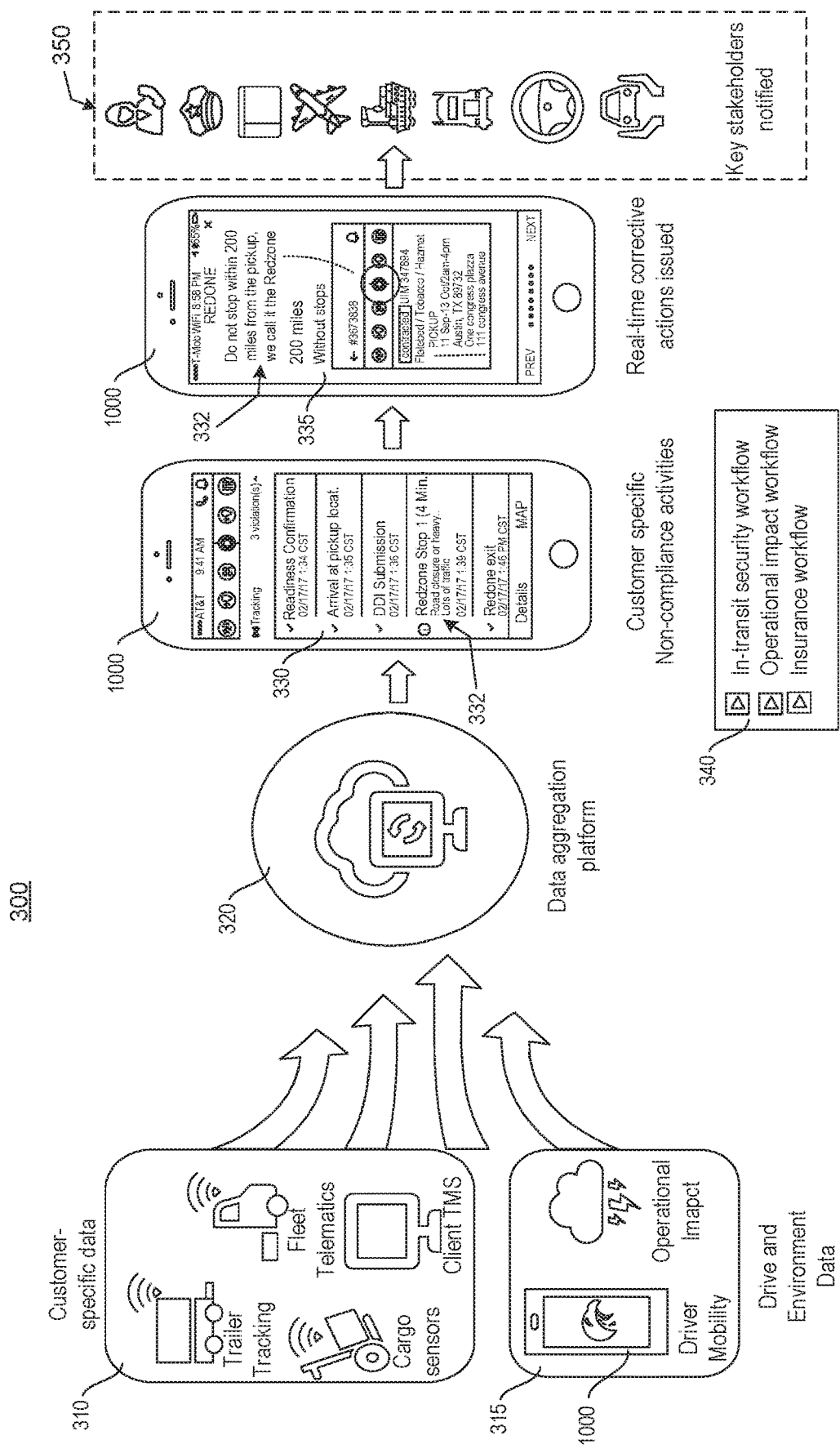
FIG. 3A illustrates an example flow of input data from a variety of different shipment-related entities and environmental sources that are received, compiled and/or aggregated to present specific workflow instructions to a mobile communication device of a driver/operator transporting the shipment, according to one or more embodiments.

Turning now to FIG. 3A, there is illustrated an example shipment information aggregation and communication environment (SIACE) 300 within which specific aspects of the disclosure are implemented. SIACE 300 includes data aggregation platform 320 that receives a plurality of different types of data, including customer specific data 310 and carrier/operator and environmental data 315. In one or more embodiments, data aggregation platform 320 is a data processing system or server, such as DPS 100 and/or CSIST server(s) 100B. Customer specific data 310 includes data received from one or more sensors attached to shipment-related entities that are being tracked and/or information received via a client terminal. Carrier/Operator and environmental data 315 are data received about the carriers and operators (including the operator MDC) and weather conditions, traffic conditions, and other monitored conditions that are available for access and which can impact the shipments. Data aggregation platform 320 provides a set of shipping related information, including shipment data and operational instructions to an operator mobile device, illustrated as MDC 100 (FIG. 10). In one embodiment, the information is downloaded to operator MDC 100 via an operator App that is added to MDC. In one embodiment, the APP includes general setup and monitoring of each shipment assigned to the operator. Details related to the shipment are presented via a shipment user interface (UI) 330 that provides a series of different features and functions and information that are accessible to the operator via the App.

In at least one of the described and illustrative embodiments, a trucking communication interface system (TCIS) module executing on a computing device is modified to include a DOTS tracking utility, which enables the computing device to provide the DOTS tracking and notification features and functionality presented herein to the operator as a downloadable App.

In the illustrative embodiment, a set of shipping parameters or operational directives are presented to the operator's MCD and a compliance check is made by the App whether the operator has stayed within the recommended parameters and objectives. When non-compliance is detected, the specific non-compliant event is flagged and/or identified and corrective actions are provided on a second shipment UI 335. Included in the information presented by the first shipment UI 330 are customer specific non-compliance activities that are identified by data aggregation platform or by local execution of the App. Included in the information presented by the second shipment UI 335 are real-time corrective actions that are issued to inform the operator to correct the non-compliance. Additionally, a set of user selected options 340 related to various workflow are available through the operator App and displayed within first shipment UI 330 or another UI that is accessible from first shipment UI 330.

According to one embodiment, in response to detection of customer non-compliance with one of the established shipping parameters or operational directives, a notification is generated and transmitted to the key stakeholders (i.e., interested parties, such as the shipper, recipient, carrier, monitoring entity, etc.) associated with the shipment, generally represented as stakeholders 350. According to the presented embodiment, the operator has failed to comply with a redzone directive 332, which requires the operator to drive continuously for a minimum distance (e.g., 200 miles) or minimum amount of time (4 Hours) before stopping once the shipment has been picked up and confirmed by the operator/carrier. In response to the MDC or the background monitoring system (CSIST server 100B) detecting that the shipment has stopped within the redzone distance, the redzone directive 332 is flagged and/or highlighted on first shipment UI 330 and a notification is generated and issued. Notification 337 is displayed via the second shipment UI 335, to inform the operator of the redzone directive for the shipment. Additional details about the specific shipment can also be accessed from the second shipment UI 335, and the operator is able to review those details by selection of associated icons or menu items. Additionally, where corrective actions are available to the monitoring system, the notification can also include this corrective action. For example, an alternate route can be provided to the operator if the environmental data received by the data aggregation platform indicates that the assigned shipment route is congested with a lot of traffic and that an alternate route exists that would allow the operator to comply with the redzone directives. The occurrence of a non-compliance is recorded to a tracking database for use in future carrier/operator shipment assignment and/or later evaluations of shipment routes, etc.

Figure 3B:
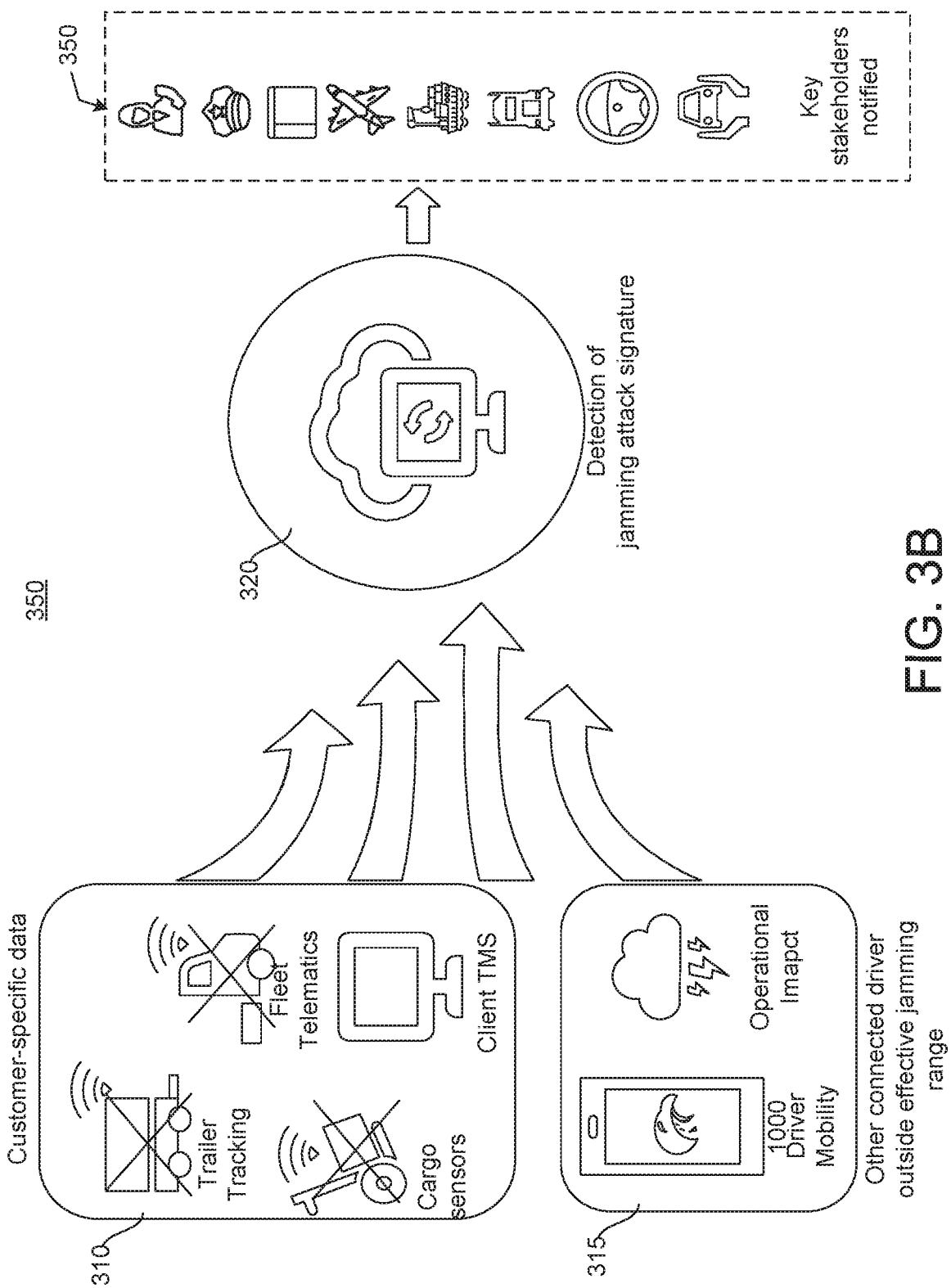
FIG. 3B illustrates an example signal jamming attack within the communication environment of FIG. 3A and the responsive identification of the attack and notification of relevant stakeholders triggered by execution of the SLTSU by aggregation server, in accordance with one embodiment.

FIG. 3B illustrates an example blocked/jammed signal transmission scenario in which the communication infrastructure server or shipment monitoring computing device (i.e., DPS 100 or CSIST Servers 100B) losses reception of the geolocation signals associated with multiple shipment-related entities of a single shipment group. As introduced above, the geolocation signals are used to generate and map a corresponding visual affordance, such as a dot that enables tracking and monitoring of the shipment. When a jamming attack occurs, all of the co-located location signals within a shipment are prevented from being transmitted to and received by the data aggregation platform 320. This scenario typically occurs when the operator is not in the tractor/truck or is not close to the shipment and tractor-trailer, such as when the operator has left the tractor-trailer while at a truck-stop. With the current example, the jamming attack does not affect the operators MDC. In response to detecting this concurrent loss of multiple signals from the co-located shipment-related entities, data aggregation platform 320 generates an appropriate notification, which is forwarded to a selected one or more of the key stakeholders 350. Notably, in the example shown, the customer specific data 310 related to the trailer, tractor, and cargo are blocked and are therefore not received by the data aggregation platform 320. However, because the operator MDC 1000 is not in the immediate location of the shipment/tractor-trailer and has not been blocked, data aggregation platform 320 transmits the generated notification to the operator MDC 1000 to alert the operator via operator MDC 1000 of the jamming attack on the shipment.

Figure 4A:
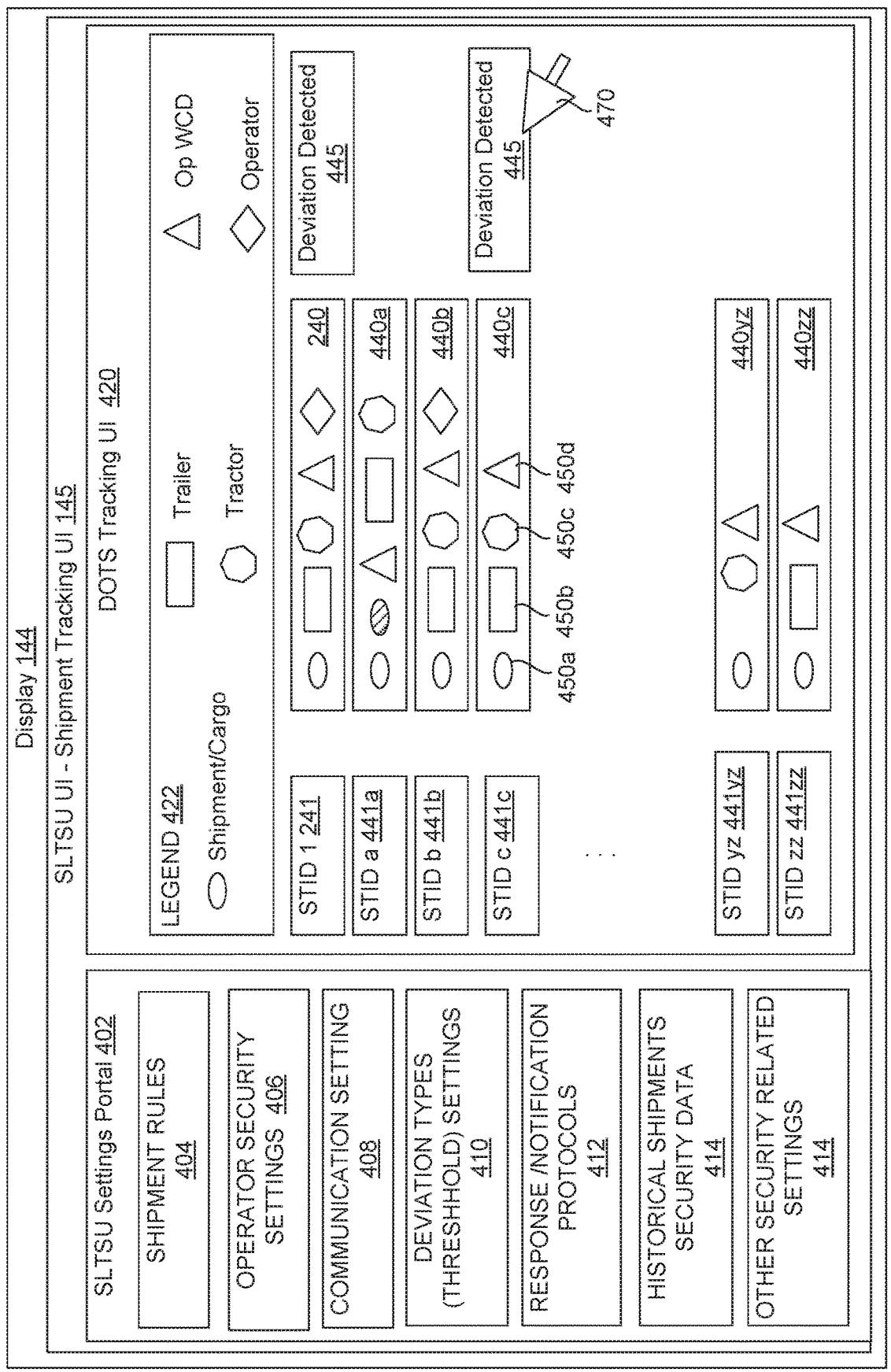
FIG. 4A is a block diagram representation content presented within an example shipment tracking user interface (STUI) providing the tracking of shipment groups using co-located visual affordances, according, according to a plurality of embodiments.

FIG. 4A illustrates components and features of STUI 145 presented in display 144 of DPS 100. As shown by FIG. 4, STUI 145 includes an SLTSU settings portal 402, in which a plurality of settings can be entered to manage the performance of SLTSU 122 and STIU 145. Included within SLTSU settings portal 402 are settings associated with shipment rules 404, operator security protocols 406, communication 408, deviation types and associated threshold values 410, security breach detection response/notification protocols 412, historical security events data storage 414, and other related security features 414.

STIU 145 also includes DOTS tracking UI 420, which can be synonymous with an interchangeably presented and described as STIU 145, in some embodiments. DOTS tracking UI 420 includes a legend 422 which identifies a type of visual affordance (i.e., a visible marker) from among a plurality of different types of visual affordances, that is assigned to each of the shipment-related entities in a shipment group. For simplicity, the visual affordances are interchangeably referred to as "dots" throughout the description. Five distinct visual affordances are illustrated, respectively associated with shipment or cargo, trailer, tractor, operator MDC, and operator. Each shipment group 240, 440a-440zz has an assigned unique STID 241, 441a-441zz. However, not all shipment groups include all five of the visual affordances, and in particular, most of the shipment groups do not include an operator visual affordance. Also, as presented by shipment group 440*a*, multiple different shipments (cargo) can be tracked to a same group 440*a*. Specifically, as shown, a second shipment (e.g., other shipment 244) being transported by the same tractor-trailer and have its own unique location signal can be simultaneously tracked within the created shipment group 440*a*. Different distinguishing characteristics (e.g., a striped pattern representing a different color) can are assigned to the different dots within the shared shipment group 440*a*. In one embodiment, each piece of cargo can be visually presented with a different dot type (e.g., color or shape), which allows for selection and specific identification of the specific cargo relative to the other cargo being tracked by associated dots. In another embodiment, each operator is also uniquely identified relative to other operators (e.g., assigned a unique operator ID), and each truck or other shipping vehicle is provided a unique signature and is thus trackable via that unique signature. The unique signatures of the location signals are wirelessly transmitted to a monitoring station, such as CSIST server 100B, via a network entity, such as a base station or access point.

Additionally, as illustrated by the last two shipment groups 440*yz*, 440*zz*, the tractor-trailer can be represented by a single visual affordance when only one transponder is associated with the combined tractor-trailer equipment. Thus, the SLTSU 122 configures the DPS 100 to visually present each shipment-related entity within a shipment group as visually distinct dots on the shipment tracking UI, using one or more of (i) a different dot type and (ii) different characteristics of a same dot type.

STIU 145 is also provided to illustrate the detection of a deviation in two of the presented shipment groups. In the illustrated embodiment, SLTSU 122 generates a deviation detected/notification icon 445 and highlights the group for which the deviation is detected. It is appreciated that in other embodiments, the presentation of the icon 445 can be optional, and SLTSU 122 can configured the DPS 100 to simply highlight one or more of the STID 241, 441 or the shipment group 240, 440 for which the deviation is detected. In yet another embodiment, the deviation can be signaled by highlighting a specific one of dots (e.g., one of visual affordance 450*a*/450*b*/450*c*/450*d*) from among the plurality of co-located visual affordances 450*a*, 450*b*, 450*c*, 4150*d* of shipment group 444*c* for which the deviation is detected. As thus presented by FIG. 4A, the SLTSU 122 further enables DPS 100 to generate and display, on the display device, the first shipment tracking user interface (UI) displaying each of a plurality of shipment groups being simultaneously tracked, and to indicate, within the first shipment tracking UI, when an anomaly has been detected in one of the plurality of shipment groups.

In one embodiment, a listing of the shipment groups is presented. However, in alternate embodiments, shipment groups are presented according to their geographic locations on a map of a monitored area or areas. With the alternate embodiment, an option to toggle between a geographic map view and a list view is provided, and the list that populates the list view then corresponds to the shipment groups within a particular selected geographic location (e.g., Austin, Tex.). In one embodiment, SLTSU 122 can present within STUI selectable options for entry of a street address or other geographic coordinate to narrow the range of shipment groups presented on the STUI. Additionally, in one or more embodiment, different views can be pre-programmed for searching. For example, SLTSU 122 can be pre-programmed with options for searching by carrier, shipper, recipient, type of shipment, origination of shipment, destination of shipment, route being taken, or general text based (word or context matching) query. It is appreciated that the list is not exclusive and not intended to convey any limitations with respect to the options provided for generating specific lists of shipment groups being tracked/monitored via co-located visual affordances or dots.

As further illustrated by FIG. 4A, DPS presents each location tracking signal within a shipment group as a separate visual affordance co-located with other visual affordances, each corresponding to the location tracking signal of a shipment entity within the shipment group. In one embodiment, DPS 100 also co-locates and presents the visual affordances representing each of the received location signals with a spatial alignment showing a separation distance of the shipment-related entities. Based on the type of location signaling mechanism, DPS 100 periodically receives updated location signals from one or more of the shipment-related entities and updates the presentation of the plurality of co-located visual affordances on the UI based on the updated location signals.

Additionally, in one embodiment, the SLTSU further enables DPS 100 to provide a geographic mapping of the plurality of co-located dots on the UI (e.g., by superimposing the dots on a map of the specific area) and compare a present location of the co-located dots to at least one of an intended shipment delivery destination and a current expected location of the shipment. DPS 100 identifies, based on the present location, if there has been a route deviation by the operator that is outside of an acceptable range of deviation from a pre-scheduled route, and DPS 100 generates and transmit at least one notification signal to inform one or more of the operator, the carrier, the shipper, or other interested party about the deviation and to correct the deviation.

Figure 4B:
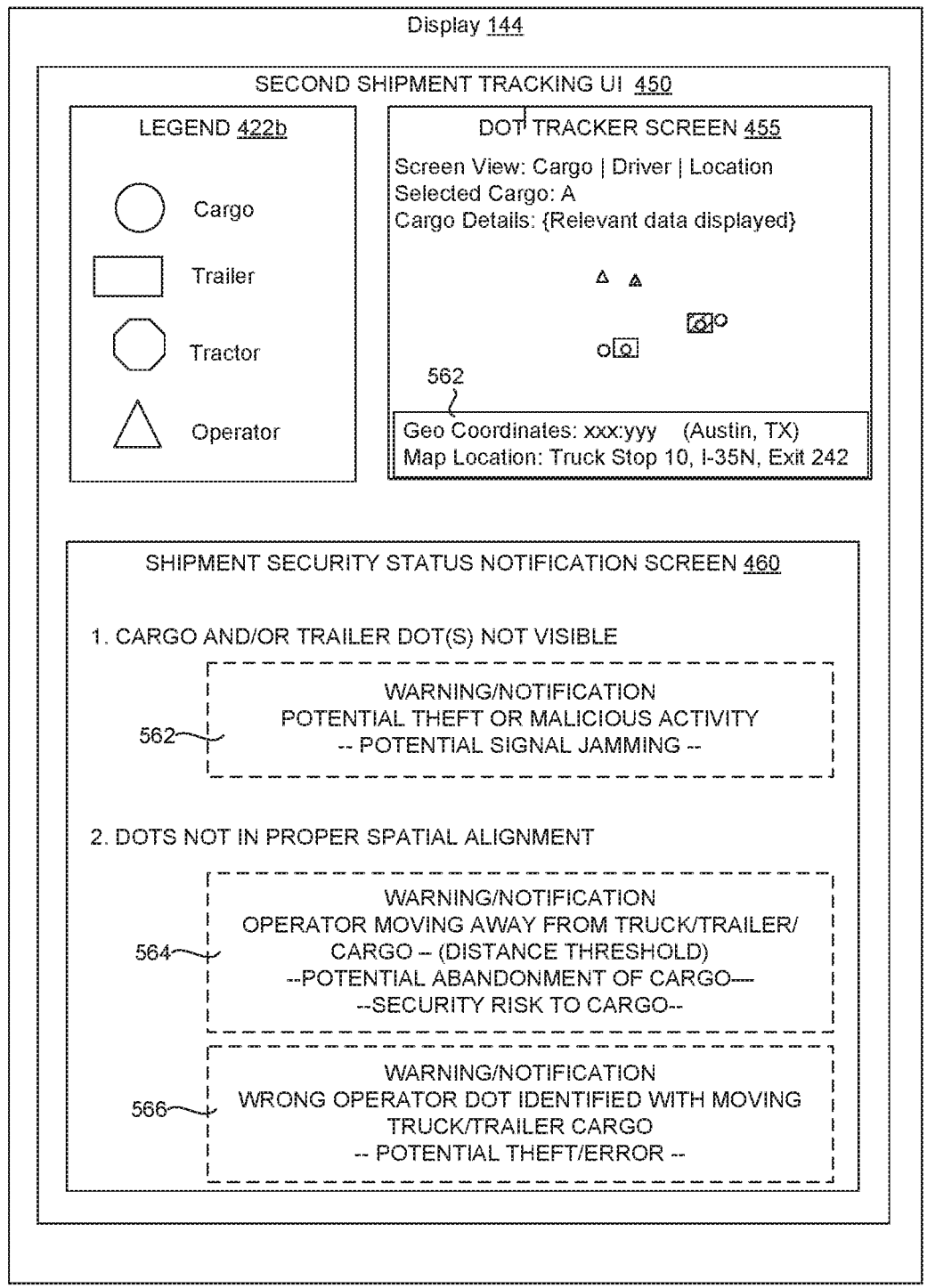
FIG. 4B illustrates a second STUI, which presents a focused view of a selected, single shipment group, according to one or more embodiments.

FIG. 4B illustrates an example second STUI for a single shipment group that is selected (such as by pointing device 470) from among the available signal groups within first STUI 145 of FIG. 4A. Second STUI 450 is opened on display 144 as a new window or an embedded window within first STUI 145. Second STUI 450 includes legend 422*b* presenting a mapping of the shipment-related entity begin tracked with the corresponding visual affordances or dots that are assigned to that shipment-related entity. Second STUI 450 also includes a DOT tracker screen 455 within which is displayed a set of dots related to one or more shipment within single geo-location. In the presented embodiment, the geo-location is a truck stop or fuel stop and a first shipment group that is being tracked and for which the second STUI 450 was opened is presented within DOT tracker screen 455, with the relative position of each shipment-related entity identified thereon. Additionally, for security and other reasons, dots associated with a second shipment group, which is in the same general location as the first shipment group are presented within the DOT tracker screen 455 for the first signal group. The second shipment group is identified with hashed dots. In one embodiment, if the operator dot for the second shipment group becomes co-located with and moves in unison with the equipment and shipment dot of the first shipment group, an anomaly is detected and a series of responsive actions are taken to protect the shipment from being taken by the wrong ("unauthorized") operator. DOT tracker screen 455 includes a geo-location coordinate bar that provides the actual geographic and/or GPS and/or map location of the shipment group.

At the bottom of STUI 450 is a shipment security status notification screen 460, which provides a current notification status of the shipment. The notification status can include one or more detected anomalies and their corresponding notification/warner messages 562, 564, 566 that is displayed within STUI 450. Three of the possible scenarios that trigger a corresponding notification 562, 564, 566 are presented. While all three notifications 562, 564, 566 are simultaneously shown within STUI, in the illustrated embodiment, it is appreciated that in actual execution, only one notification would be generated and displayed, based on the actual detected anomaly, unless multiple anomalies are simultaneously detected.

Referring now to FIGS. 5A-5D and 6A-6D, there are illustrated several different examples of the types of deviations that can be detected by SLTSU 122 based on the presentation and relative spacing of the dots on STIU 145. FIGS. 5A-5D and 6A-6D are a plurality of example dots tracking user interfaces (UI) presenting focused views of a single shipment group that is selected from among the plurality of shipment groups presented within STIU 145 of FIG. 4. In FIG. 5A-5D, each dots tracking UI 500 includes a status notification bar 510 that presents a current status of the corresponding shipment based, at least in part, on the presence, relative alignment, and movement of the dots representing the shipment-related entities within a shipment group. In addition to the status notification bar 510, each dots tracker UI 500 includes additional information/data about the particular shipment, operator and tractor-trailer equipment, geolocation data, and movement tracking data, each of which can be selected by a user to present additional relevant details about the selected item. Within the various figures, immediate visual notification of an anomaly, deviation, or other condition that triggers a potential security breach is presented as bolded font. In actual implementation, the visual notification can be an applied highlight color or flashing of specific content within the UI 500. Notably, in addition to the notification or alert being highlighted, relevant sets of tracking information related to one aspect of the shipment can also be highlighted (bolded) to direct the monitoring personnel's attention to access that relevant/associated tracking information.

In one or more embodiments, FIGS. 5A-5D and 6A-6D are generated in response to selection of one STID 241, 441, selection of one shipment grouping 240, 440, or selection of deviation notification icon 445 within STIU 145, or more specifically, within DOTS tracking UI 420. Thus, SLTSU 122 configures DPS 100 to perform the functions of: in response to detecting a selection of the unique STID or visual affordance of a specific shipment group being displayed STIU, generate and display, on the display device, a second shipment tracking UI that provides detailed information about a corresponding shipment and a current or last recorded location of each shipment-related entity of the shipment group relative to a location of each other shipment-related entity within the shipment group and in relation to a geographic or location coordinate of the shipment-related entities. In one embodiment, in response to placing the shipment in the enhanced watch/monitoring state, DPS 100 automatically generates and displays a second shipment tracking UI (e.g., dots tracking UI 500a, FIG. 5A) providing additional shipment details corresponding to the shipment and the shipment-related entities comprising the shipment group.

Figure 5A:
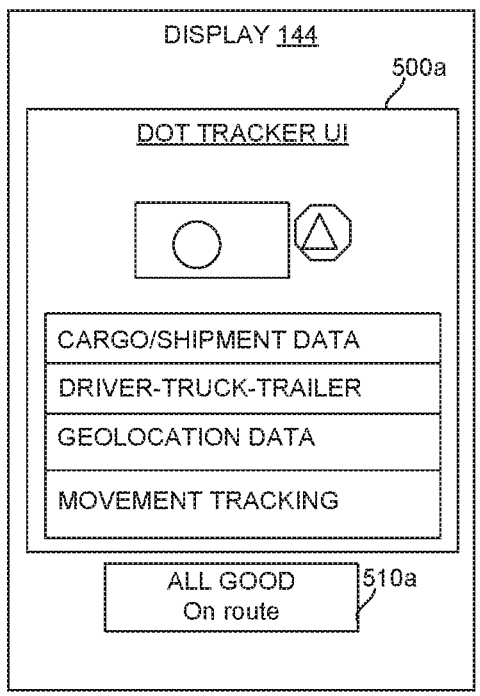

Referring to FIG. 5A, there is illustrated first example dots tracking UI 500a in which the dots are spatially aligned in the correct order and within the acceptable range of distance from each other. Additionally, the dots are moving in unison with each other, at an acceptable velocity along a shipment route towards a delivery destination. With these conditions, SLTSU provides an ALL GOOD notification as there are no deviations or anomalies detected that present a security risk to the shipment. It is appreciated that the spatial alignment of the dots and separation distance are parameters that can be different from one shipment to another. In the illustrated embodiments, the shipment dot is expected to be within or proximate to the trailer dot, while the tractor dot is expected to be ahead of both dots when moving towards the intended delivery destination (assuming the route information is known and including in the shipping information stored by within the SLTSU DB 182). Further, the operator MDC dot and/or the operator dot is expected to be inside of in close proximity to the tractor dot when the shipment is moving.

In each of the presented embodiments, the operator's location is tracked via the location signal received for operator MDC, and both are assumed to be synonymous and in the same general location. To account for periods in which the operator may stop for fuel or rest or other expected reasons, a separation distance is provided for at least one of the co-located dots and the operator/operator MDC dot and vice versa. As an example, a separation distance of 100 meters is provide as a threshold maximum distance that the operator will be away from the tractor trailer and/or the shipment during normal transportation periods. Any detection of a separation distance above this threshold will be considered a deviation and will cause SLTSU 122 to cause DPS 100 trigger a notification of potential security risk.

In another embodiment, the disclosure provides for monitoring and tracking of an unscheduled and/or unexpected separation event, such as one or more of the dots that should remain collocated in the same geolocation moving away from the other dots. As one example, the separation event can include the tractor/truck moving away from the trailer. As another example, the separation event can include one of the cargo dots moving away from the trailer or vice-versa outside of an intended pick-up or drop-off location for that specific cargo. An appropriate set/sequence of notifications and/or responses is generated based on the collected data related to the event.

Figure 5B:
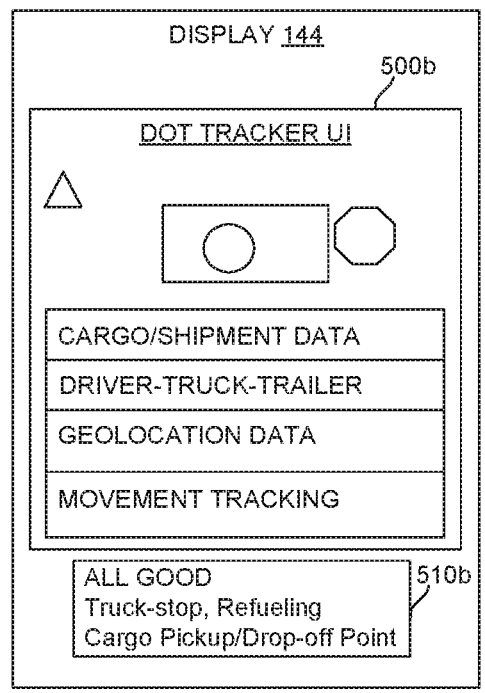

FIG. 5B illustrates second dot tracker UI 500b in which the operator has left the tractor, but is within an acceptable separation distance from the shipment. More specifically, SLTSU 122 has deduced that operator has stopped at a truck stop and/or is refueling, based on the geographic location map of the area in which the tractor-trailer is parked. Alternatively, in one embodiment, the shipment may have arrived at a known/expected drop off point (or operator rest area), such that operator separating from the shipment and/or the tractor-trailer is acceptable.

Figure 5C:
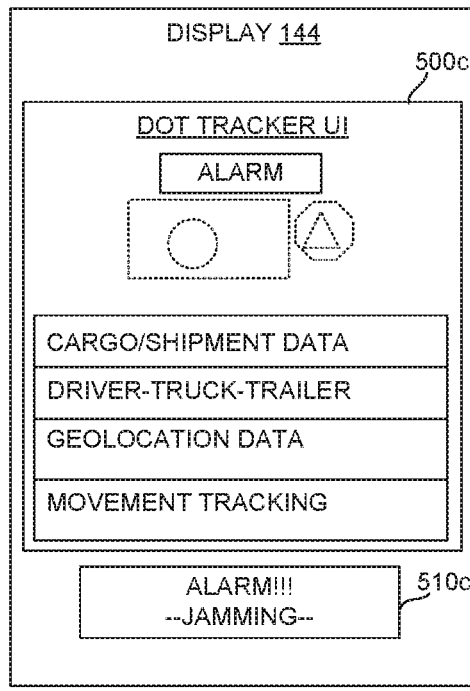

FIG. 5C illustrates third dot tracker UI 500c in which the location signals for the entire group of shipment-related entities become undetected for a period of time. In at least one embodiment, the concurrent loss of all location signals triggers SLTSU 122 to generate a warning of a jamming attack and notify the operator and others about the detected attack. Thus notification status bar 510c clearly indicates this alert status. According to one aspect, the amount of time is a programmed parameter that can depend on other information related to the shipping route, geographic location, etc. For example, when the loss of visible dots (i.e., location signals) occurs while the shipment is determined to be moving in a tunnel, the time period can be set to an amount of time expected for the tractor-trailer to exit the tunnel.

Other environmental scenarios would trigger a different time period or no delay at all. In the above embodiment, a determination of a potential problem is made (and responsive actions taken) only if a signal loss condition continues/lasts more than a pre-set threshold amount of time. This allows the system to account for detected loss of signal that may be caused by a faulty transmitter or entry into a tunnel located on route, etc.

Figure 5D:
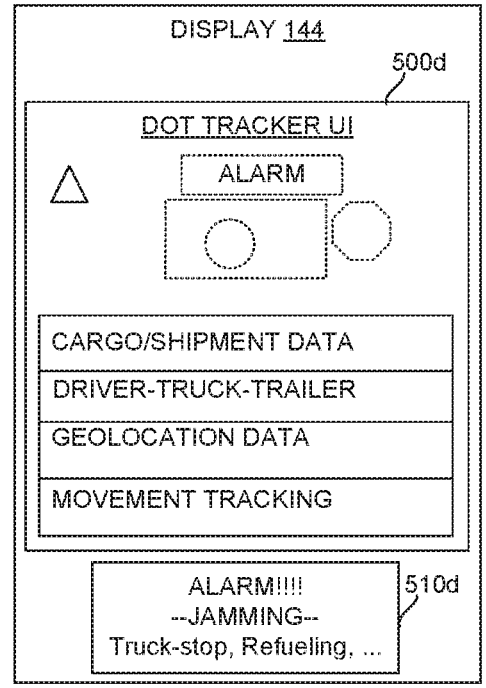

FIG. 5D illustrates fourth dot tracker UI 500d in which the location signals for only some of the group of shipment-related entities become undetected. In this specific scenario, the operator is at a truck stop and away from the tractor-trailer. Notification status bar 510d thus provides the warning about the jamming attack, but also presents additional details related to the environment and/or location that may be helpful to counter the attack.

FIG. 6A illustrates fifth dot tracker UI 600a in which a directional movement of the dots for a shipment group indicates that the shipment is being driven off-route. SLTSU 122 triggers an alert that is displayed within notification status bar 610a indicating that the shipment is being moved off-route. This trigger can, in one embodiment, require the shipment be a threshold minimum distance (e.g., 1 mile) off route before the notification status bar is updated to reflect the alert. A check of the traffic conditions and other environmental conditions can also be integrated in the determining process to identify if there is a valid reason for the operator to have changed routes.

FIGS. 6B-6C illustrates two scenarios that involve an unscheduled separation of dots in respective dots tracker UIs. In FIG. 6B, sixth dot tracker UI 600a shows the operator and trailer tractor moving away from the trailer and cargo at a rate of speed and for a time period that indicates the operator may be abandoning the shipment. Notification status bar 610b is updated to provide this warning/alert. In FIG. 6C, a similar alert can be reported via notification status bar 610c; however, in this embodiment, the shipment has been removed from the trailer and is being left at a location that is not the delivery destination. DPS 100 therefore determines the separation may likely be an abandonment of the cargo. Alternatively, depending on the location at which the cargo was removed from the trailer, SLTSU 122 can determine that an incorrect drop-off of shipment has occurred. In either scenario, SLTSU 122 triggers a series of responsive actions, which can include communicating this error to the operator's MDC or the carrier.

In one or more embodiments, monitoring for separation events is further extended to include monitoring for and identifying an unattended vehicle scenario in which the driver leaves the truck/trailer at a location that is not within the expected zone of driver separation. For example, the driver may either abandon a shipment/cargo and/or simply take a unscheduled stoppage of his transport of the shipment by leaving the truck and trailer at a truck stop or other parked location and moving away from or outside of the expected "safe zone" (e.g., 50 yards/meters) from the truck/trailer. A rate of driver movement away from the shipment (as identified by the velocity of the moving driver dot) can indicate the driver is in another vehicle that is moving away from the location of the truck/trailer/cargo. An appropriate set/sequence of notifications and/or responses is generated based on the collected data related to the event.

FIG. 6D illustrates, via sixth dot tracker UI 600d, the scenario in which the wrong operator takes a shipment (i.e., either the cargo or the trailer loaded with the cargo). This situation can occur at a shipping port or shipment transit point at which the shipment is left to be picked up by an authorized operator. When the shipment begins to move from the port and the authorized operator is not the one who picks up the shipment, STLSU configures DPS 100 to recognize that the location signal of the shipment is co-located with the wrong driver or that the location signal of the shipment is moving away from the transit point without being co-located (and thus move in unison) with the location signal of the authorized operator. It should be noted that this scenario also applies to a theft of a tractor-trailer with onboard shipment, such as when the operator is at a truck-stop or another location outside of the tractor but the shipment is detected moving away from the operator. STLSU 122 configures the DPS 100 to generate a notification of a possible theft of the shipment and displays that notification on notification status bar 610d.

Figure 7:
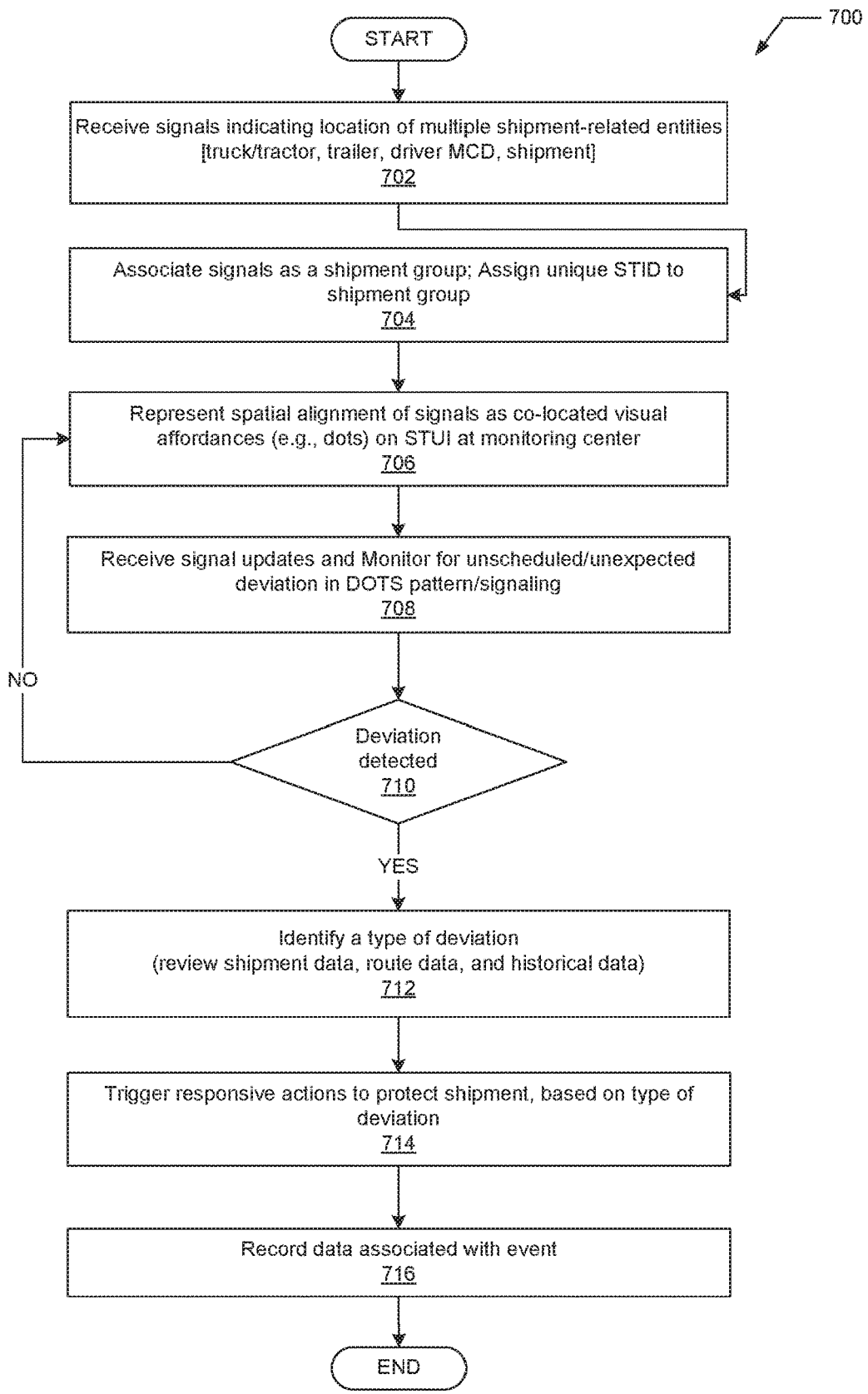
FIG. 7 provides a flow chart illustrating a method for monitoring shipments using co-located dots and responding to detected anomalies or deviations in the expected movement and/or presentation of the dots, in accordance with a plurality of embodiments.

Referring now to FIG. 7, there is presented a flow chart of one method by which the devices and infrastructure of the preceding figures are utilized to present certain aspects of the shipment monitoring and security features of the present disclosure. Within the preceding figures, and according to one aspect of the disclosure, there is presented data processing system 100, which includes a memory 110 having stored thereon a shipment location tracking and security utility (SLTSU) 122. DPS 100 also includes a display device 144 that enables visual presentation of at least one graphical user interface (UI) 145 generated by the SLTSU 122. DPS 100 further includes at least one network interface device (NID) 160 that enables the DPS 100 to receive and transmit information via one or more communication networks 170/210. DPS 100 further includes at least one processor 105 coupled to the memory 110, the display device 144, and the at least one NID 160. The processor 105 executes the SLTSU 122 to enable DPS 100 to perform the features illustrated by method 700 of FIG. 7.

For simplicity, each of the presented methods (i.e., 700, FIG. 7, 800, FIG. 8, and 900, FIG. 9) are described from the perspective of DPS 100 performing the various described functions. It is appreciated that DPS 100 is configured to perform the various functions based on execution of SLTSU 122 by processor 105. Further, certain of the functions are performed by other components of DPS 100, such as the receiving and transmitting of location signals and notifications, respectively, which are, in part, performed by NID 160 (FIG. 1).

As provided by FIG. 7, the SLTSU 122 enables/configures DPS 100 to receive, via the at least one NID, a plurality of location tracking signals indicating a location of multiple shipment-related entities that are being tracked concurrently as a shipment group (block 702). SLTSU 122 configures DPS 100 to associate the location tracking signals as a shipment group and assign a unique shipment tracking identifier (STID) to the shipment group to track movement of the location tracking signals (represented as co-located dots) relative to each other and to a shipping route 235 (block 704). At block 706, and with specific reference now to FIGS. 4-6, SLTSU 122 configures DPS 100 to present the shipment group 240 as a plurality of co-located visual affordances 450a, 450b, 450c, 450d on a shipment tracking user interface (UI) 145 (FIG. 4), where each location tracking signal is represented by one visual affordance 450a/450b/450c/450d from among the plurality of co-located visual affordances 450a, 450b, 450c, 450d.

DPS 100 is further configured to monitor for any unscheduled deviations in at least one of an expected co-location and an expected geo-location of received updates to the location tracking signals within each shipment group being tracked (block 708). In response to detecting (at decision block 710)

an unscheduled deviation, DPS 100 is further configured to identify a specific type of the unscheduled deviation (block 712), and, based in part on the specific type of the unscheduled deviation identified, trigger a series of responsive actions to protect the shipment (block 714). DPS 100 is further configured to record data associated with the event (block 716). Then, method 700 completes at end block.

It should be appreciated that the cycle of monitoring the shipment will continue until the shipment is delivered to the end destination or other measures are taken to stop monitoring the shipment group. Also, in one embodiment, the detection of and response to a deviation includes the DPS 100 determining, from metrics associated with the detected change and previous patterns of behavior of input signals, whether the detected change indicates a potential bad and/or malicious and/or illegal and/or financially detrimental act directed towards the shipment. In response to determining that the detected change is indicative of a bad act associated with the shipment, DPS 100 triggers responsive actions to one or more of (i) prevent the occurrence of the bad act or (ii) to mitigate/reduce (a) a timing of response to and/or (b) an effect on the shipment caused by the bad act.

Figure 8A:
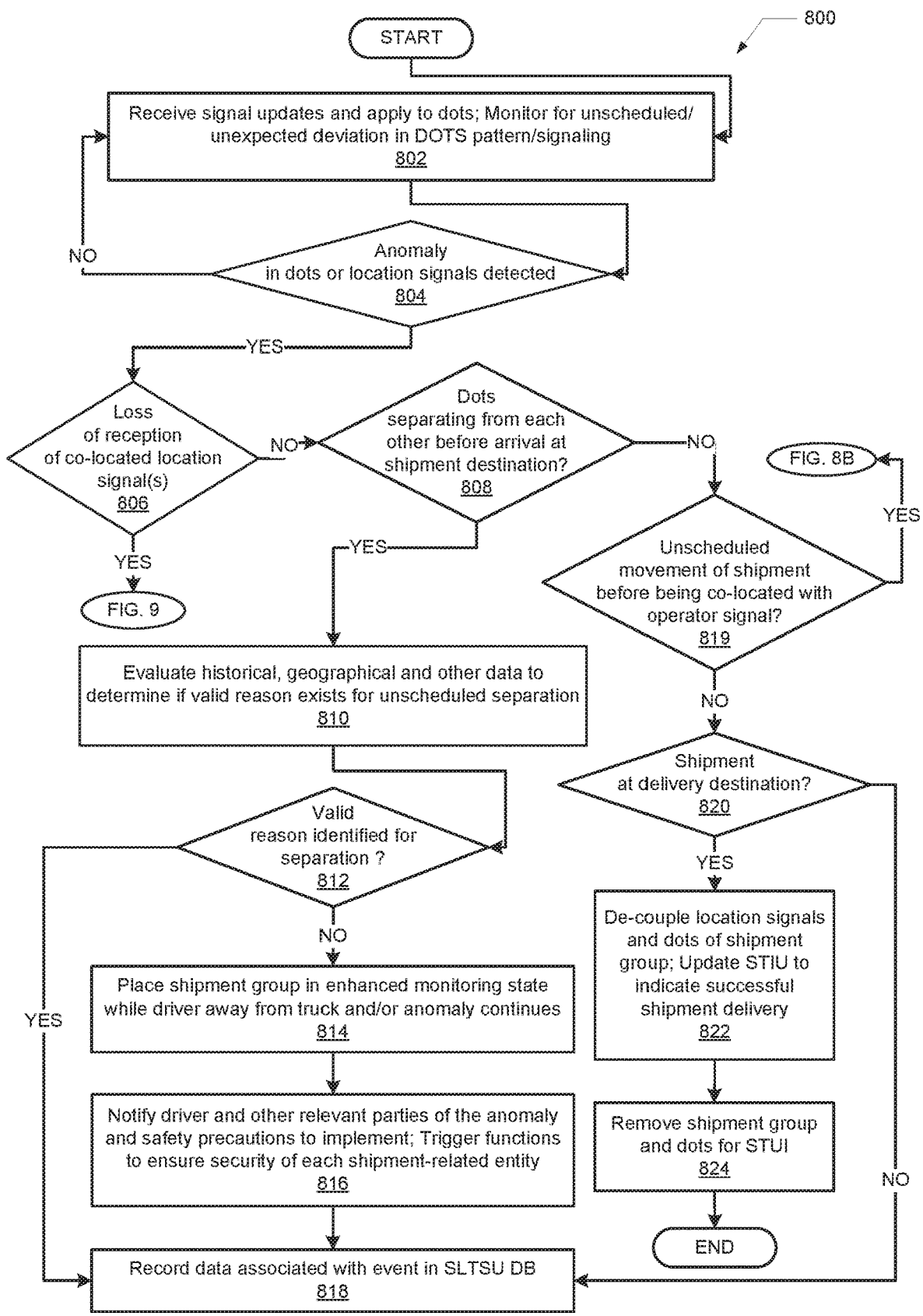
FIG. 8A provides a flow chart illustrating a method for identifying a type of anomaly and responding to separation of co-located dots outside of expected separation zones, in accordance with one or more embodiments.
Figure 8B:
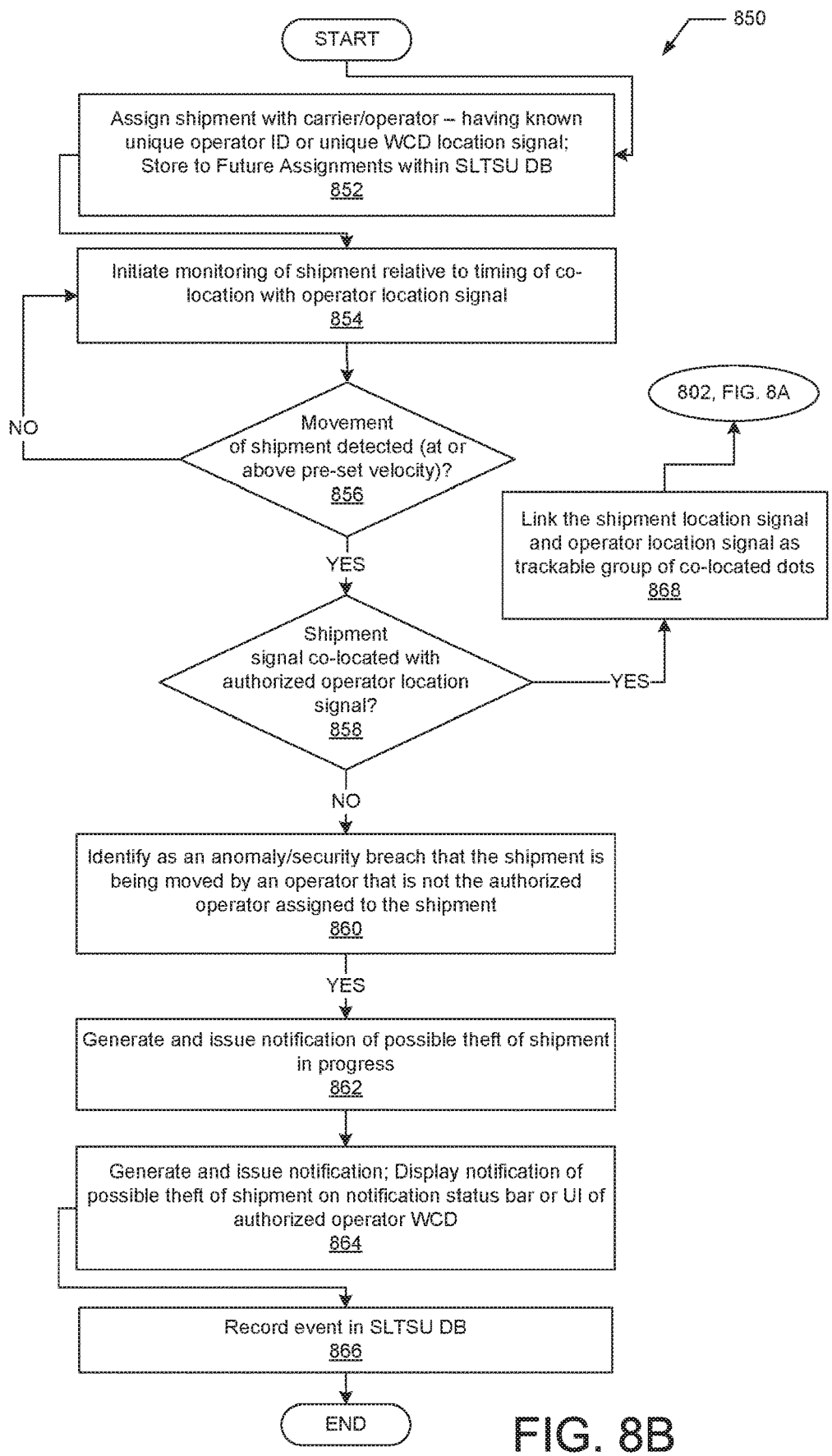
FIG. 8B provides a flow chart illustrating a method for identifying when a shipment is moved by someone other than an authorized and assigned driver/operator, in accordance with one or more embodiments.

Referring now to the flow chart of FIG. 8A-8B, there is illustrated an example method 800 in which the specific type of deviation is determined and corresponding responsive actions thereto are triggered. FIGS. 8A-8B expands on the processes of block 706-714 of FIG. 7, according to one or more embodiments. Beginning at block 802, DPS 100 receives location signal updates, assigns the updates to the corresponding dots, and modifies the location of the dots within the shipment groups based on the location signal updates, and monitors the update for any unscheduled or unexpected deviations or anomalies in the dots pattern or in the received location signals. At block 804, STLSU 122 configures DPS 100 to detect an occurrence of an anomaly that can include one or more of (i) loss of reception of the location signals from one or more of the shipment-related entities, (ii) unscheduled changes in a spatial relationship of the shipment-related entities or corresponding visual affordances on the STUI, and (iii) a movement of shipment dot from pick-up location before being co-located and grouped with operator dot, indicative of an unauthorized taking of shipment. DPS 100 determines via blocks 806, 808, and 820 whether the anomaly is (i) a loss of reception of the location signals from one or more of the shipment-related entities (decision block 806), (ii) unscheduled changes in a spatial relationship of the shipment-related entities or corresponding visual affordances on the STUI (decision block 808), or (iii) a movement of shipment dot from pick-up location before being co-located and grouped with operator dot, indicative of an unauthorized taking of shipment (decision block 810). In response to the anomaly being a loss of reception (as determined at block 806), method 800 transitions to the process of method 900 presented by FIG. 9.

In response to determining (at decision block 808) that the detected anomaly is/includes an unscheduled change in spatial relationship (i.e., separation) of the co-located dots (and thus the shipment-related entities) from each other before a shipment delivery at the intended destination, DPS 100 determines if there is a valid reason for the unscheduled separation by evaluating historical data and received data about the shipment-related entities, the route, geographic location at which the unscheduled separation occurs, and received environmental conditions (block 810). In response to not identifying a valid reason for the unscheduled separation, as determined at block 812, method 800 includes SLTSU configuring DPS 100 to flag the shipment for enhanced monitoring (block 814), trigger security measures to alert relevant parties of the occurrence of the anomaly (block 816), and create and store a record of the occurrence of the anomaly (block 818). Returning to block 808, in response to the anomaly being an unscheduled change in directional movement of the dots relative to each other, method 800 transitions to method 850 of FIG. 8B. Assuming the detected anomaly is not one of the aforementioned anomalies, method 800 transitions to decision block 820 at which DPS 100 determines if the shipment and associated separation of dots from each other or disappearance of dots from the tracking system is occurring at the delivery destination. In one embodiment, in response to the separation or disappearance of the dots occurring at the shipment delivery destination (as determined at block 820), DPS 100 decouples the location signals within the shipment group and updates a shipment tracking system to indicate that the shipment has been delivered (block 822). DPS 100 also updates the shipment tracking UI to remove the shipment group and plurality of co-located visual affordances used for tracking the shipment group (block 824). Method 800 then ends.

According to one embodiment, to enable the DPS 100 to monitor for any unscheduled deviations, the STLSU configures DPS 100 perform at least one of: (a) compare a present geographic location of the visual affordance on a geographic location mapping to an expected geographic location, based on a prescribed route for the shipment; and identify whether there has been a route deviation by the operator; (b) monitor for changes in an alignment pattern and separation distance of the visual affordances corresponding to each of the shipment-related entities within the shipment group, relative to an expected alignment and separation distance; and (c) monitor for specific changes in a reception of the input location signals, which specific changes are changes that are indicative of an anomaly.

Referring now to FIG. 8B, there is illustrated an example method 850 by which the anomaly/deviation involves an incorrect operator taking a shipment, as illustrated above with sixth dot tracker UI 600*d* of FIG. 6D. With continuing reference to the illustration of FIG. 6D, method 850 begins at block 852 with a shipment being assigned to and associated (e.g., by the CSIST server, DPS 100, shipper, or other associated entity) with an authorized operator (and operator equipment). The assignment/association is stored within SLTSU DB and the shipment is then monitored for co-locating purposes with the location signal of the authorized operator (block 854). Following detected movement of shipment by at least a minimum distance from a shipping port, at a velocity that indicates the shipment is being moved out of the port (block 856), a determination is made (block 858) of whether the shipment has been co-located with the authorized operator (i.e., the shipment is not being moved by someone who is not the authorized operator). In response to the shipment not being co-located with the authorized operator, STLSU configures DPS 100 to determine/recognize that the location signal of the shipment is co-located with the wrong driver or that the location signal of the shipment is moving away from the transit point without being co-located with the location signal of the authorized operator (block 860). STLSU 122 configures DPS 100 to identify a security breach involving the shipment being taken by someone who is not the authorized operator for that shipment (862). STLSU 122 configures the DPS 100 to generate a notification of a possible theft of the shipment in progress (block 864) and to display that notification on notification status bar 610*d* or on a user interface of the authorized operator's MDC (block 866).

According to one embodiment related to assignment of and pickup by an operator to a future shipment, SLTSU configures DPS 1000 to identify an intended operator and shipping vessel assigned to a future shipment awaiting pickup by the intended operator, the intended operator having an operator ID and a communication device that provides a unique device location signal that is associated with the operator ID, the shipment also having a unique shipment location signal. DPS 100 associates the operator ID to the future shipment. DPS 100 then monitors a geo-coordinate location of the future shipment prior to pick-up by the operator. In response to a received signal indicating the operator has picked-up the shipment, DPS 100 links and co-locates the unique operator device (MDC) location signal and unique shipment location signal to create and track a new shipment group (block 868).

While monitoring for the pickup, DPS 100 is also configured to identify an anomaly from among: (i) detecting a change in the geo-coordinate location of the shipment by more than a first threshold distance prior to the unique shipment tracking signal being co-located with the unique device location signal; and (ii) detecting that a second operator device signal, different from the unique device location signal, is co-located with and begins to move in unison with the unique shipment tracking signal, where the second operator device signal is not associated with the operator or a second operator that has been assigned to transport the shipment. In response to identifying the anomaly, DPS 100 is configured to trigger a series of responsive actions designed to prevent or stop an unauthorized operator from taking the shipment.

According to one embodiment, the method includes receiving a signal from one or more shipment-related entities, including a shipment/cargo tracker and possibly including a trailer transmitter/responder. The method includes identifying, as an intended driver of the shipment, a specific driver having a corresponding operator MCD (e.g., a smart phone) that provides a unique operator signal, and also includes matching the unique operator signal to the shipment associated entities; monitoring the signals received from the shipment associated entities and the unique driver signal to identify when the signals become collocated and begin to move in unison. The method further includes identifying when a different driver signal approaches and/or begins to move in unison with the other tracked signals. The method includes, in response to identifying that a different driver signal is collocated with the other signals, performing a series of responsive actions, based on a determination that the incorrect driver is taking the shipment. The responsive actions can include one or more of, but are not limited to, notifying the correct driver, recording the incident, signaling the different driver, notifying law enforcement, etc.

Figure 9:
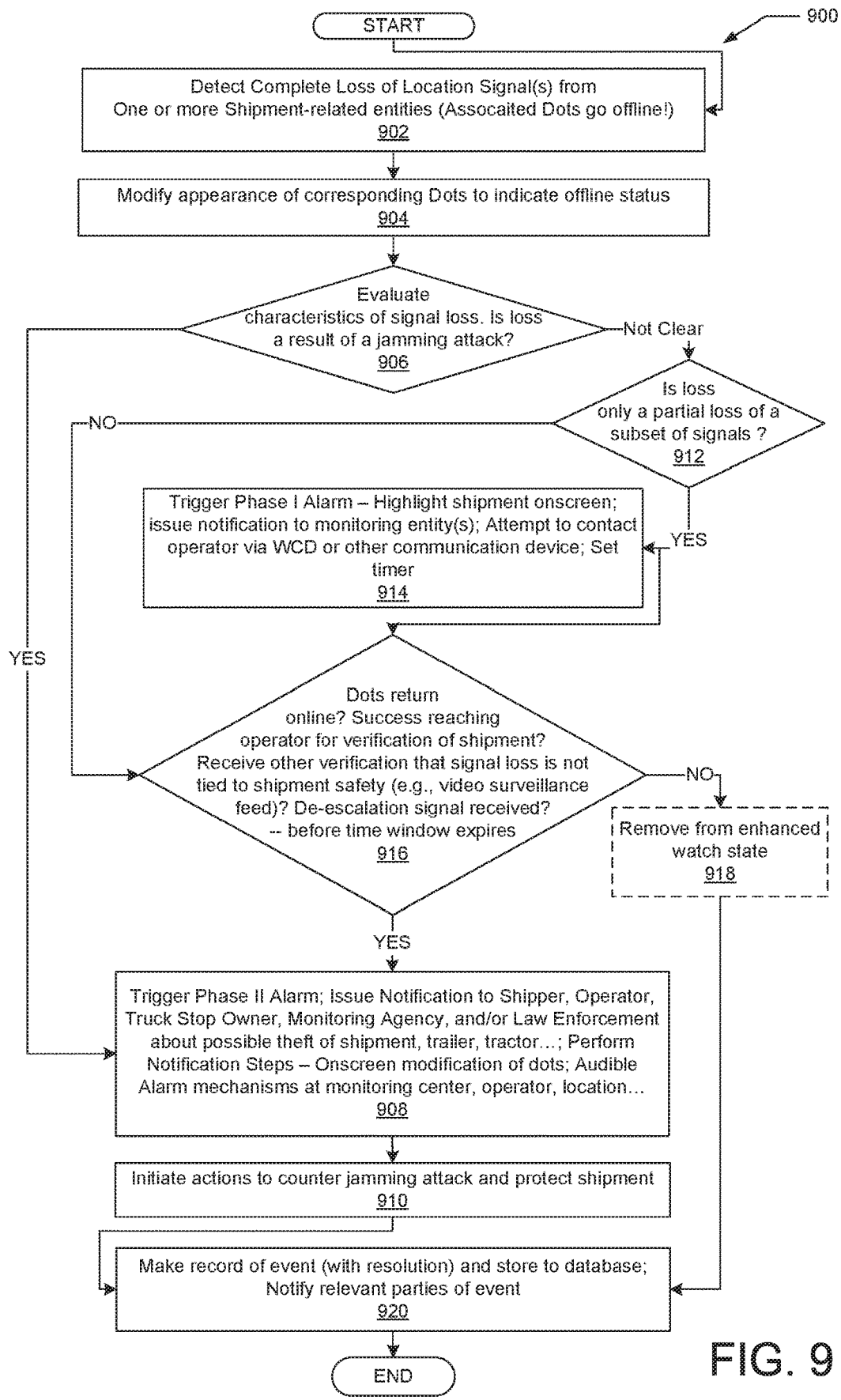
FIG. 9 provides a flow chart illustrating a method for identifying and responding to jamming attacks and a loss of location signals, in accordance with one or more embodiments.

FIG. 9 provides a flow chart of the method for responding to an anomaly that involves the loss of one or more of the location signals of at least one shipment entity associated with a shipment group, as illustrated by FIGS. 5C and 5D. Method 900 begins at block 902 at which DPS 100 detects a complete loss of at least one location signal from a corresponding one or more of the shipment entities. In response to the detected complete loss, DPS 100 removes or modifies (by ghosting the appearance or flashing) the visual affordance corresponding with the location signal for that shipment entity within the STUI (block 904). At decision block 906, DPS 100 determines, based in part on characteristics associated with the loss of the at least one signal, whether the loss is a result of a jamming attack at the location of the shipment. In response to determining that the resulting loss is a result of a jamming attack, DPS 100 generates and issues, to relevant parties, a specific notification that identifies detection of the jamming attack and possible attempts to steal shipment and/or equipment (block 908). The notifications can be visual on-screen notifications and/or audible alarms, and the like. DPS 100 initiates one or more actions to counter the jamming attack and protect one or more of the shipment-related entities from bad act (block 910). DPS 100 records the event and any resolution thereof to SLTSU DB (916)

According to one embodiment, DPS 100 determines at block 912 whether the loss is a partial loss of received location signals, affecting only a subset of the shipment-related entities within the shipment group. In response to the signal loss being a partial loss, DPS 100 triggers a low level alarm event and sets a timer to track an amount of time that elapses following detection of the partial loss of signal (block 914). DPS monitors (via decision block 916) whether partial loss of received location signal is resolved before expiration of a pre-established time window. In response to the partial loss being resolved within the pre-established time window, DPS 100 generates and stores a record of the event as a recovered, partial loss of signal incident occurring at a geographic location of the shipment-related entity when the loss occurred (block 920). However, in response to the partial loss condition not being resolved within the pre-established time window, method 900 transitions to block 908 and DPS 100 triggers a higher level alarm status and generates real-time alerts and notifications of potential theft of one or more of the shipment-related entities. Accordingly, in the illustrated embodiment, in response to one of (i) all of the dots simultaneously disappearing for more than the pre-established window of time and (ii) not receiving the de-escalation signal prior to expiration of the pre-established window of time when only a subset of the location signals disappear from the monitoring system, DPS places the shipment in an elevated danger state and triggers a higher level alarm to initiate a series of responsive operations and actions.

In one embodiment, DPS 100 sets a timer for a pre-established window of time before the notification is issued (block 914). At decision block 916, DPS 100 checks whether a de-escalation signal is received from a trusted party providing a verification of a safety of the shipment prior to expiration of a pre-established window of time. In response to receiving the de-escalation signal prior to expiration of a pre-established window of time, DPS 100 optionally (as illustrated by dashed border lines) removes the shipment from the enhanced watch/monitoring state (block 918), and records the event and subsequent de-escalation thereof within the SLTSU DB (block 920).

According to one or more embodiments, and as illustrated by FIGS. 2, and 5B-5D and 6A-6D, in performing the series of responsive actions based on the specific type of deviation identified, DPS 100 performs at least one of the following: high-light, on the shipment tracking UI, a corresponding visual affordance or the unique ID one of the shipment group for which the deviation is detected; output at least one of an on-screen visual notification and an audible notification to alert a monitoring personnel about the detected deviation; and communicate the notification to a remote communication device of at least one of an operator and a shipper associated with the shipment to provide real-time notification of the deviation. Additionally, in response to the deviation being a concurrent or substantially simultaneous loss of a plurality of the location signals within a single shipment group, DPS 100 issues a notification that includes an alert to one or more communicatively-connected parties of a potential jamming attack that may indicate malicious intent towards one or more of the shipment entities.

According to one aspect, storage of DPS includes SLTSU DB which has stored thereon shipping data utilized and periodically updated by the SLTSU. The SLTSU enables DPS 100 to concurrently track multiple different shipment groups in multiple different geographic locations, update a shipping history of each of the multiple different shipment groups during a life cycle of each shipment, and store the update within the storage/SLTSU DB. Additionally, DPS 100 aggregates, associates, and/or correlates detected activities, location, and triggered responses in a learning module that facilitates future handling of similar detected events that can occur.

According to one aspect a shipment monitoring and security system is provided. The SMSS includes at least one computing device that is communicatively coupled to at least one network. The computing device can be similarly configured to perform similar operations as DPS 100. Specifically, the computing device includes at least one communication module that supports information transfer over the at least one network and which receives a plurality of location signals, each location signal associated with a respective shipment-related entity among a plurality of geographically co-located, shipment-related entities that collectively form a shipment group that is tracked during completion of a shipment. Further, the computing device is configured to generate, based in part on the geographic coordinates of the received location signals, a shipment tracking user interface (UI) on which is displayed a current location of each of shipment-related entities via visual affordances that are presented at a spatial alignment relative to each other and to a geographic location coordinates. Further, the computing device is configured to detect an occurrence of an anomaly comprising one or more of (i) loss of reception of the location signals from one or more of the shipment-related entities, (ii) unscheduled changes in a spatial relationship of the shipment-related entities or corresponding visual affordances on the STUI, (iii) an unscheduled change in a directional movement of the visual affordances associated with a single shipment group relative to each other, and (iv) a movement of shipment dot from pick-up location before being co-located and grouped with operator dot, indicative of an unauthorized taking of the shipment.

According to one embodiment, the SMSS includes a plurality of location tracking mechanisms associated with each of a shipment, a shipment container, a user equipment of an operator, and a shipping vessel/vehicle. The plurality of location tracking mechanisms enable detection of a location coordinate and transmission via an intermediary tracking system of location coordinate data to the computing device via one or more communication networks to which the computing device is communicatively coupled.

According to one embodiment, a method includes a DPS monitoring a relative location of an operator to a shipment via one or more sensor signals received for shipment-related entities of a shipment group. The method includes detecting a separation of at least one of (i) an operator signal from a trailer/tractor signal, (ii) a shipment signal from the trailer/tractor signal; and (iii) the operator signal from the shipment signal. The method further includes, in response to the separation being greater than a pre-established, acceptable separation distance, generating and issuing a notification that informs a recipient of an occurrence of the detected separation being greater than the pre-established acceptable separation distance.

According to one embodiment, the method includes, in response to the separation being a separation of at least one of (i) the operator signal from the tailor/tractor signal or (ii) the operator signal from the shipment signal during a period when the separation is not scheduled to occur: identifying the separation as correlated to an unattended or abandoned vehicle scenario in which the operator has left the tractor-trailer at a location that is not within an expected safe zone of operator separation; and triggering a notification of the unattended vehicle scenario to at least one interested party.

According to another embodiment, the method includes determining, from analyzing a change in geographic location of a received location signal over time, a velocity of operator movement away from the shipment, relative to a previous co-location coordinate. The method further includes determining, based on the velocity of operator movement away from the shipment, that the operator is in another vehicle that is moving away from the location of the shipment, and notifying at least one of the operator, a shipper, and security personnel that the operator is deviating from an acceptable shipping plan relative to the shipment and may be abandoning the shipment prior to completion of delivery.

Additionally, the method includes: retrieving, for the identified shipment, shipping details related to a destination, preferred or recommended routes, and projected schedule of shipment movement, including expected stops, for the recommended shipping route; forwarding the shipment data to the operator device; and monitoring for an unscheduled separation event. According to one embodiment, the separation event involves one or more of the received location signals and mapped visual affordances that are expected to remain co-located in a same geo-coordinate location moving away from other visual affordances in the geo-coordinate location. According to one or more embodiments, the unscheduled separation event can include at least one of: (i) the tractor/trailer moving away from the shipment; (ii) the shipment moving away from the trailer or vice-versa, while not located within an intended pick-up or drop-off location for that shipment; and (iii) the operator moving away from the shipment or the tractor/trailer, beyond an acceptable separation distance.

Referring now to FIG. 10, there is illustrated an example user communication device, which is presented as mobile communication device (MDC) 1000. MCD 100 is an operator device and can interchangeably be described as such. Specifically, FIG. 10 depicts a bot a 3-dimensional image as well as a block diagram representation of the component makeup of a mobile communication device (MCD). MCD 100 operates within a wireless communication network and serves as the electronic device within which several of the operator-associated features of the disclosure can be implemented. According to the general illustration, MCD 1000 is a communication device that is designed to communicate with other devices via one of a wireless communication network, which may be included within data communication network 210 (FIG. 2). MCD 1000 can be one of a host of different types of devices, including but not limited to, a mobile cellular phone or smart-phone, a laptop, a net-book, an ultra-book, and/or a tablet (e.g., an iPAD®), or other computing device with access to wireless connectivity. The utilized devices includes the necessary hardware and software to enable wireless-enabled communication between MCD 1000 and a network via which information and/or data and voice communication required to implement the various features described herein to facilitate security of shipments via the general location signal communication environment 200 and execution of SLTSU 122.

Referring now to the specific component makeup and the associated functionality of the presented components, MCD 1000 comprises processor 1010, which connects via a plurality of interconnects (illustrated by the bi-directional arrows) to a plurality of other functional components of MCD 1000. Processor 1010 can be an integrated circuit that includes one or more programmable microprocessors and a digital signal processor (DSP). Processor 1010 controls the communication, program code execution, power mode control, time synchronization, and other functions and/or operations of MCD 1000. These functions and/or operations thus include, but are not limited to, application data processing and signal processing.

Connected to processor 1010 is storage 1015, memory 1020, input/output (I/O) devices and communication mechanisms 1055. Memory 1008 can include volatile memory and/or non-volatile memory. During device operation, one or more executable applications can be stored within memory 1020 for execution by processor 1010. For example, memory 1020 is illustrated containing local SLTSU App 1022, which is a downloadable app or utility that executes on MCD 1000. SLTSU App 1022 includes shipment tracking user interface (STUI) 1024 and biometric verification module 1026, which is utilized to verify operator to access certain secure functions of MCD 1000. As an example, a voice or fingerprint confirmation may be required before allowing a carrier/driver to pick up a high value shipment, so that only a specific pre-authorized carrier can perform the transportation of that shipment. Thus, for example, a department of defense (DOD) shipment will be released only to a DOD cleared carrier.

Memory 1020 further includes shipment compliance tracking utility 1028, which can provide access to available maps and which utilizes a GPS sensor or other location detection sensor or function of MCD to report an exact location of MCD 1000 back to CSIST server (DPS) 100B. Within shipment compliance tracking utility 1028 is DOTS tracking utility (or SLTSU) 1030, which is a local operator device version of and performs similar functions as SLTSU 122 (FIG. 1). Also included in shipment compliance tracking utility 1028 is compliance module 1032, which provides the compliance monitoring and response features presented in the description of FIGS. 3A-3B. The two 3D views of MCD 1000 presents example compliance user interface 1005 with a dot tracker feature/section 1006 for tracking the onboard shipment group. In one embodiment, selection of that dot tracker feature 1006 from compliance user interface 1005 triggers the opening of second user interface 1007, which provides DOTS tracker UI with location dots for each shipment-related entity positioned relative to each other within a geographic map. In normal operation, the operator has possession of MCD 1000 and either the operator and/or MCD are typically within close proximity to the operator's equipment on which a shipment has been loaded. In one or more embodiments, additional tracking features are provided within the equipment and or the shipment that allow for CSIST (data aggregation) framework 200 to identify, in real time, when the carrier and/or MCD 1000 moves out of an acceptable range away from the shipment or equipment.

Memory 1020 also includes shipment data and confirmation utility 1034, jamming detection module 1036, and un-authorized operator detection module 1038. The functionality associated with and/or usage of each of the software modules will become evident by the descriptions provided herein. It is appreciated that the various software modules can be independent modules that communicate with each other via processor execution of respective program code.

Referring again to the figure, storage 1015 can be any type of available storage device capable of storing one or more application software, firmware, and data. It is further appreciated that in one or more alternate embodiments, the device storage can actually be or can include remote storage, such as a cloud storage, and not necessarily be fully integrated within the device itself. As provided, storage 1015 contains a local version of SLTSU DB 1018 that can include some of the operator login credential and biometric information to allow for local processing of the operator's login to a CSIST framework, in one or more embodiments. Storage can also include a database of device settings associated with the particular subscriber.

MCD 1000 also comprises a plurality of input/output (I/O) devices 1040. I/O devices 1040 include, as input devices, camera 1042, microphone 1044, touch screen and/or touch pad and/or keypad 1046, and biometric sensor 1052, and, as output devices, display 1048 and speaker 1050, and others. MCD 1000 can also include a subscriber identification module (SIM) or other similar feature that provides unique identification information of the carrier that owns or utilizes MCD 1000. In order to allow MCD 1000 to synchronize operations and/or provide time data, MCD 1000 also includes system clock (not shown).

According to one aspect of the disclosure and as illustrated by FIG. 10, MCD 1000 supports at least one and potentially many forms of wireless, over-the-air communication, which allows MCD 1000 to transmit and receive communication, including location signals, with at least one second device and/or an externally located network. To support wireless communication, MCD 1000 includes one or more of the following communication components: wireless network communication module 1060 (which can include a transceiver with connected antenna, both not expressly provided), near field communication (NFC) transceiver module 1062, wireless fidelity (WiFi) module 1064, and Bluetooth® transceiver 1066. It is appreciated that MCD 1000 can also include components for wired communication, such as modem and Ethernet modules (not shown). Collectively, these wireless and wired components provide a communication means or mechanism 1055 by which MCD 1000 can communicate with other devices and networks. To enable location-based services within/on the device, MCD 1000 also includes a location service module, such as a GPS module, without limitation.

MCD 1000 establishes communication with the at least one other device via over-the-air signal transmission, following the exchange of specific authentication and/or access credentials. The communication between MCD 1000 and the second devices can be via near field communication, Bluetooth, infrared (IR) transmission, and others, without limitation. As a wireless device, MCD 1000 can transmit data over a wireless network (e.g., a Wi-Fi network, cellular network, Bluetooth® network (including Bluetooth® low energy (BLE) networks), a wireless ad hoc network (WANET), or personal area network (PAN)). In one embodiment, MCD 1000 may be further equipped with an infrared (IR) device (not pictured) for communicating with other devices using an IR connection. In another embodiment, MCD 1000 may include a short-range wireless device, including, but not limited to, a near field communication (NFC) device. In still another embodiment, MCD 1000 may communicate with one or more other device(s) using a wired or wireless USB connection.

According to an implementation embodiment, MCD 1000 includes a display providing a user interface and a memory having stored thereon a shipment location tracking utility (SLTU). MCD 1000 also includes a processor communicatively connected to the display and the memory and which executes the Dots tracking utility 1020 to enable the user communication device to perform the method processes of FIGS. 7, 8A-8B, and 9 with modifications to the location signal receiving and tracking processes to include a remote aggregator, in one embodiment, and direct connections from the MCD 100 in other embodiments. Further, with the MDC-based implementation of methods 700, 800, 850, 900, additional modifications are provided to enable the generated notifications to be immediately displayed on the display of MCD 1000. According to one aspect of the disclosure, the modification to the notification is made because the operator becomes the principal consumer and/or recipient of the notifications, as the operator owns the MCD, is physically closest to the shipment for the majority of the time, and is therefore able to take affirmative steps to protect the shipment. Thus, the notifications are either locally generated and displayed on MCD 1000, or the notifications are received from the DPS 100, CSIST server 100B, or data aggregator 320 and displayed on MCD 1000.

Similar to the execution of STLSU 122 by processor 105 of DPS 100, processor 1010 of MCD 1000 executes local STLSU or Dots utility 1030, which enables MCD 1000 to track a series of dots corresponding to a shipment assigned to the operator/carrier for transporting to one or more respective destinations. MCD 1000 receives a location signal for each of the shipment and a tractor trailer. MCD 1000 co-locates and group the dots (each representing unique tracking affordances) of the shipment (a first tracking affordance) with that of the shipping vessel (operator equipment or tractor-trailer) (a second tracking affordance) and the MCD (a third tracking affordance). Dots of the MCD 1000 thus corresponds to the authorized operator for the shipment. In one embodiment, the location signals and other data related to the shipment are received from data aggregator (320, FIG. 3), such as CSIST server 100B. In at least one embodiment, the data for all other entities of the shipment group is locally received and aggregated by processor execution of Dots utility 1030.

MCD 1000 presents, within the user interface, the group of dots representing a relative co-location of each of the cargo and the tractor trailer. MCD 1000 automatically updates a relative location of each dot within the group to correlate to a current real-time location. MCD 100 detects an unscheduled separation of the dots and compares a separation distance to a pre-set threshold maximum separation distance. MCD 1000 determines when a detected separation distance of one of the tracking affordances is greater than the pre-set threshold maximum separation distance, and in response to the detected separation distance being greater than the pre-set threshold maximum separation distance, MCD 1000 generates and issues a notification signal to alert at least one of the operator and a remote monitoring device that an anomaly has been detected with the movement of the shipment that can affect a security of the shipment. It is appreciated that the tracking of the shipment and updating of the co-located dots continues until that shipment is delivered or another terminal even is received. For example, in one embodiment, the operator removes or deletes the shipment group from the STUI. In another embodiment, the assigning and removal is performed by a remote system (e.g., CSIST servers 100B) that downloads updates to the operator's copy of the SLTSU App with new shipment assignments and removes the completed shipment assignments once confirmation of the delivery is received at the remote system computers.

MCD 1000 is also configured to track an assigned future shipment. MCD 1000 receives a shipment assignment providing information about a shipment that is to be picked up and transported by the operator from a given shipment pick-up point to a shipment delivery point and provide a unique tracking affordance corresponding to the shipment. MCD 1000 maps the unique tracking affordance to a current location of the shipment on a co-location map presented on a tracking UI. MCD 1000 also receives movement data associated with the unique tracking affordance and updates a mapping on a displayed co-location map. MCD 1000 monitors for anomalies in a current location of the shipment prior to the operator arriving at the origination point to receive the shipment, and in response to detecting an anomaly in the current location, MCD 1000 generates and issues to the user interface a notification about the anomaly. Specifically, in one embodiment in response to detecting the anomaly, MCD 1000 transmits a notification to a monitoring server about the disappearance to trigger tracking of a location of the shipment relative to known operators to identify whether one of the known operators has mistakenly taken the shipment. In one embodiment, the notification is communicated to the carrier or the shipper directly. In another embodiment, the notification can be transmitted to a port controller when the shipment is being held at a shipping port for pickup.

Also, as one aspect, the notification of third parties can be triggered from the remote server, which receives the initial notification from MCD 1000. MCD 1000 thus serves as a localized security sensor that identifies anomalies affecting only those shipments assigned to MCD 1000, and MCD 1000 immediately communicates the anomaly to the remote system for responsive action.

According to one embodiment, detection of the anomaly can involve the shipment's unique tracking affordance moving away from the origination point at a velocity that indicates the shipment has been picked up by another moving vessel. With this embodiment, MCD 1000 triggers tracking of a location of the shipment relative to known operators to identify whether one of the known operators has mistakenly taken the shipment. The tracking of the shipment can be performed by the remote system with a wider range of sensors and tracking capabilities and communication access to the MCDs of other operators and to law enforcement.

According to another embodiment, MCD 1000 detects an anomaly that involves a disappearance of a plurality of the unique tracking affordances, where the location signals are no longer detectable. In response to detecting the disappearance of the dots, MCD 1000 generates and issues an alert indicating that the shipment is likely under a jamming attack, and MCD 1000 transmits the notification with information about the disappearance to a remote monitoring server (CSIST server 100B).

In one embodiment, MCD 1000 is a smart phone or tablet or other communication device of a driver/operator that is equipped (or programmed) with a DOTS tracking application (app). The DOTS tracking app enables MCD 1000 to be configured to track a series of dots corresponding to cargo assigned to the driver for transportation to one or more respective destinations. Multiple different methods for inputting the specific cargo's unique signal within the app can be provided. Once inputted (or downloaded), the cargo's location relative to the operator is determined and presented on the user interface of the MCD. The driver may then monitor his shipment locally on his device. Any improper movement (or other activity) of monitored dots can then be detected locally and the driver provided with a notification that enables the driver to immediately check on the status of the cargo and/or his truck. New shipment information can also be relayed to the driver ahead of pickup so the driver can be alerted if another driver mistakenly or deliberately attempts to take the truck and/or shipment from the pick-up point.

In one embodiment, the specific operator setup of the MCD 1000 and specifically the SLTSU App 1030 executing on MCD 1000 is required in order to enable the tracking of the operator and implementation of certain aspects of the shipment tracking features described herein. Similar to the implementation of SLTSU 122 on DPS (FIGS. 1 and 4), the SLTSU App 1030 can provide visual tracking of multiple assigned shipments, and can also provide a selection feature that enables a zoning in on a single one of the assigned shipments to view specific details about that shipment on the device's STUI.

As a paid for application, use of the tracking features can be added on to the base communication infrastructure module as an additional service offered and/or a premium offering. Additionally, security features can be provided that includes one or more of temperature monitoring, door lock monitoring, with/without remote locking, and on-board video monitoring. These features can be provided as add-ons with an associated service costs payable when added to a base service, such as coordinating assignment of shipments to operators. The operator may elect to have a full version of the App 1030 installed or a location tracking version only. With the full version, additional functionality can be provided at the MCD 1000, such as the localized tracking of an assigned shipment, etc.

As further described herein, implementation of the functional features of the disclosure described herein can involve use of a combination of hardware, firmware, as well as several software-level constructs (e.g., program code and/or program instructions and/or pseudo-code) that execute to provide a series of methods that present the different features and functions of the disclosure.

In the above description, exemplary embodiments in which various aspects of the disclosure may be practiced are described in sufficient detail to enable those skilled in the art to practice the invention. It is to be understood that other embodiments may be utilized and that logical, architectural, programmatic, mechanical, electrical and other changes may be made without departing from the spirit or scope of the present disclosure. The above description is an extended summary and therefore, should not to be taken in a limiting sense, and the scope of the present disclosure will be defined by appended claims and equivalents thereof.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the invention not be limited to the particular embodiments disclosed for carrying out the disclosure, but that the disclosure will include all embodiments falling within the scope of any appended claims. Moreover, the use of the terms first, second, etc. do not denote any order or importance, but rather the terms first, second, etc. are used to distinguish one element from another.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:
1. A data processing system comprising:
a memory having stored thereon a shipment location tracking and security utility (SLTSU);

a display device that visually presents at least one graphical user interface (UI) generated by the SLTSU;
at least one network interface device (NID) that enables the data processing system to receive and transmit information via one or more communication networks;
at least one processor coupled to the memory, the display device, and the at least one NID, and which executes the SLTSU to configure the data processing system to:
receive, via the at least one NID from the one or more communication networks, a plurality of location tracking signals indicating a location of multiple shipment related entities that are being tracked concurrently as a shipment group;
associate the location tracking signals as a shipment group and assigning a unique shipment tracking identifier (STID) to the shipment group to track movement of the location tracking signals relative to each other;
present, on the display device, the shipment group as a plurality of co-located visual affordances on a first shipment tracking user interface (UI), wherein each received location tracking signal is represented by one visual affordance from among the plurality of co-located visual affordances;
monitor for any unscheduled deviations in at least one of an expected co-location and an expected geo-location of received updates to the location tracking signals within the shipment group; and
in response to detecting an unscheduled deviation: identify a specific type of the unscheduled deviation; and trigger at least one responsive action from among a plurality of responsive actions comprising (i) generating and outputting, via a UI presented on the display device, a notification of the unscheduled deviation, (ii) generating and forwarding at least one notification, via the NID, to at least one remote device that is communicatively connected to the data processing system via the one or more communication networks, the at least one notification causing a corresponding output to be provided at the at least one remote device, and (iii) modifying contents of a database associated with the data processing system to update the database to include a history of the unscheduled deviation, the at least one responsive action selectively triggered based on the specific type of the unscheduled deviation.

2. The data processing system of claim 1, wherein the SLTSU further enables the data processing system to:
generate and display, on the display device, the first shipment tracking user interface (UI) displaying each of a plurality of shipment groups being simultaneously tracked; and
indicate, within the first shipment tracking UI, when an anomaly has been detected in one of the plurality of shipment groups.

3. The data processing system of claim 1, wherein presenting the shipment group as a plurality of co-located visual affordances on a shipment tracking UI comprises the SLTSU further configuring the data processing system to:
present each location tracking signal within a shipment group as a separate visual affordance co-located with other visual affordances, each corresponding to a respective location tracking signal of a shipment-related entity within the shipment group;
co-locate and present the visual affordances representing each of the received location signals with a spatial alignment showing a relative separation distance of the shipment-related entities;
periodically receive, via the NID from the one or more communication networks, updated location signals from one or more of the shipment-related entities;
update, on the display device, the presentation of the plurality of co-located visual affordances on the UI based on the updated location signals.

4. The data processing system of claim 3, wherein the SLTSU configures the data processing system to visually present each shipment-related entity within a shipment group as visually distinct dots on the shipment tracking UI, using one or more of (i) a different dot type and (ii) different characteristics assigned to a same dot type.

5. The data processing system of claim 1, wherein the SLTSU configures the data processing to perform the functions of:
in response to detecting a selection of the unique STID or visual affordance of a specific shipment group being displayed STIU, generate and display, on the display device, a second shipment tracking UI that provides detailed information about a corresponding shipment and a last recorded location of each shipment-related entity of the shipment group relative to a location of each other shipment-related entity within the shipment group and in relation to a geographic or location coordinate of the shipment-related entities and shipping route.

6. The data processing system of claim 1, wherein:
the plurality of co-located visual affordances comprises a plurality of co-located dots, each dot representing a location of a shipment-related entity as determined from a respective one of the received location signals; and
wherein to monitor for any unscheduled deviations, the STLSU configures the data processing system to:
detect, following receipt or non-receipt of updates to one or more of the plurality of location tracking signals, an occurrence of an anomaly from among a group comprising (i) loss of reception of the location signals from one or more of the shipment-related entities, (ii) unscheduled changes in a spatial relationship of the shipment-related entities or corresponding visual affordances on the STUI, and (iii) an unscheduled movement of a shipment location signal from a shipment pick-up location before being co-located and grouped with an operator location signal, indicative of an unauthorized taking of shipment; and
in response to detecting an anomaly that includes an unscheduled separation of the co-located dots from each other before a shipment delivery at the intended destination:
determine if there is a valid reason for the unscheduled separation by evaluating historical data and received data about the shipment-related entities, the route, geographic location at which the unscheduled separation occurs, and received environmental conditions; and
in response to not identifying a valid reason for the unscheduled separation: flag the shipment for enhanced monitoring; trigger security measures to alert relevant parties, via transmission of the at least one notification to the at least one remote devices, of the occurrence of the unscheduled separation of the co-located dots; and create a record of the occurrence of the anomaly and update the database by storing the record to the database.

7. The data processing system of claim 6, wherein to monitor for any unscheduled deviations, the STLSU configures the data processing system to perform at least one of:
compare a present geographic location of the visual affordance on a geographic location mapping to an expected geographic location, based on a prescribed route for the shipment; and identify whether there has been a route deviation by the operator;
monitor for changes in an alignment pattern and separation distance of the visual affordances corresponding to each of the shipment-related entities within the shipment group, relative to an expected alignment and separation distance; and
monitor for specific changes in a reception of the input location signals, corresponding with known specific changes that are indicative of a security issue.

8. The data processing system of claim 6, wherein the STLSU configures the data processing system to:
in response to the deviation being a separation of the shipment entities from each other occurring at an unscheduled time prior to the shipment reaching a shipment delivery destination;
evaluate, using historical data retrieved from the database and geographical mapping data, a geographic location at which the separation occurs;
place the shipment in an enhanced watch/monitoring state;
trigger a performance of one or more security features that informs at a least one of the operator and the shipper of the separation; and
create and storing a record of the separation event and responsive actions taken; and
in response to the separation occurring at the shipment delivery destination:
de-couple the location signals within the shipment group;
update a shipment tracking system to indicate that the shipment has been delivered; and
update the shipment tracking UI to remove the plurality of co-located visual affordances for tracking the shipment group.

9. The data processing system of claim 8, wherein the STLSU configures the data processing system to: in response to placing the shipment in the enhanced watch/monitoring state, dynamically generate a second shipment tracking UI providing additional shipment details corresponding to the shipment and the shipment-related entities comprising the shipment group; and display the second shipment tracking UI on the display device.

10. The data processing system of claim 6, wherein the STLSU configures the data processing system to:
check whether a de-escalation signal is received from a trusted party providing a verification of a safety of the shipment prior to expiration of a pre-established window of time;
in response to receiving the de-escalation signal prior to expiration of a pre-established window of time, remove the shipment from the enhanced watch/monitoring state; and
in response to one of (i) all of the dots simultaneously disappearing for more than the pre-established window of time and (ii) not receiving the de-escalation signal prior to expiration of the pre-established window of time when only a subset of the location signals disappear from the monitoring system: place the shipment in an elevated danger state; and trigger a higher level alarm to initiate a series of responsive operations and actions.

11. The data processing system of claim 6, wherein the unscheduled deviation comprises a loss off a location signal of at least one shipment entity associated with a shipment group, and the STLSU configures the data processing system to:
detect a complete loss of at least one location signal from a corresponding one or more of the shipment entities;
in response to the detected complete loss, modify a presentation within the shipment tracking UI of the visual affordance corresponding with the location signal for that shipment entity;
determine, based in part on characteristics associated with the loss of the at least one signal, whether the loss is a result of a jamming attack at the location of the shipment; and
in response to determining that the resulting loss is a result of a jamming attack:
generate and issue to one or more of the at least one remote device a specific notification that identifies detection of the jamming attack; and
initiate one or more actions to counter the jamming attack and protect one or more of the shipment-related entities from bad act.

12. The data processing system of claim 11, wherein the STLSU configures the data processing system to:
in response to the signal loss being a partial loss of received location signals affecting only a subset of the shipment-related entities within the shipment group:
trigger a low level alarm event;
set a timer for a pre-established time window to track an amount of time that elapses following detection of the partial loss of signal;
monitor whether partial loss of received location signal is resolved before expiration of the pre-established time window; and
in response to the partial loss being resolved within the pre-established time window, record the event, including a geographic location of the shipment-related entity when the partial loss occurred; and
in response to the partial loss not being resolved within the pre-established time window, generate and issue, via the NID over the one or more communication networks, real-time alerts and notifications of a detected problem with a corresponding location tracking mechanism that may indicate tampering and a potential theft of an associated shipment-related entity.

13. The data processing system of claim 1, wherein to perform the series of responsive actions based on the specific type of deviation identified, the SLTSU configures the data processing to perform at least one of:
visually high-light, on the shipment tracking UI, a corresponding visual affordance of the unique ID one of the shipment group for which the deviation is detected;
output at least one of an on-screen visual notification and an audible notification to alert a monitoring personnel about the detected deviation; and
communicate the notification to a remote communication device of at least one of an operator and a shipper associated with the shipment to provide real-time notification of the deviation.

14. The data processing system of claim 1, wherein the SLTSU configures the data processing system to:
in response to the deviation being a concurrent or substantially simultaneous loss of a plurality of the location signals within a single shipment group, issue a notification that includes an alert to one or more communicatively-connected parties of a potential jamming attack that may indicate malicious intent towards one or more of the shipment entities.

15. The data processing system of claim 1, wherein the SLTSU configures the data processing to:
identify an intended operator and shipping vessel assigned to a future shipment awaiting pickup by the intended operator, the intended operator having an operator identification (ID) and a communication device that provides a unique device location signal that is associated with the operator ID, the shipment also having a unique shipment location signal;
associate the operator ID to the future shipment;
monitor a geo-coordinate location of the future shipment prior to pick-up by the operator;
in response to a received signal indicating the operator has picked-up the shipment, link and co-locate the unique device location signal and unique shipment location signal to create and track a new shipment group.

16. The data processing system of claim 15, wherein the SLTSU configures the data processing to:
identify an anomaly from among: (i) detecting a change in the geo-coordinate location of the shipment by more than a first threshold distance prior to the unique shipment tracking signal being co-located with the unique device location signal; and (ii) detecting that a second operator device signal, different from the unique device location signal, is co-located with and begins to move in unison with the unique shipment tracking signal, where the second operator device signal is not associated with the operator or a second operator that has been assigned to transport the shipment; and
in response to identifying the anomaly, trigger a series of responsive actions designed to prevent or stop an un-authorized operator from taking the shipment.

17. A method comprising:
receiving, via a network interface device (NID) communicatively coupled to receive location data from a plurality of location tracking mechanisms though one or more communication networks, a plurality of location signals at a computing device, each location signal indicating a location of one of multiple geographically-co-located entities that are being tracked concurrently as a shipment group associated with a specific shipment;
associating the location tracking signals as a shipment group and assigning a unique shipment tracking identifier (STID) to the shipment group to track movement of the location tracking signals relative to each other;
presenting, on a display device, the shipment group as a plurality of co-located visual affordances on a shipment tracking user interface (UI), wherein each location tracking signal is represented by one visual affordance from among the plurality of co-located visual affordances;
receiving, via the NID, updates to the location of one or more of the multiple geographically-co-located entities;
monitoring the updates to identify unscheduled deviations in at least one of an expected co-location and an expected geo-location of received updates to the location tracking signals within the shipment group; and
in response to detecting an unscheduled deviation: identifying a specific type of the unscheduled deviation; and triggering a series of responsive actions based on the specific type of the unscheduled deviation.

18. The method of claim 17, further comprising:
generating and displaying, on a display device, the first shipment tracking user interface (UI) that displays respective locations of each of a plurality of shipment groups being simultaneously tracked; and
indicating, within the first shipment tracking UI, when an anomaly has been detected in one of the plurality of shipment groups.

19. The method of claim 17, wherein presenting the shipment group as a plurality of co-located visual affordances on a shipment tracking UI comprises:
presenting each location tracking signal within a shipment group as a separate visual affordance co-located with other visual affordances each corresponding to the location tracking signal of a shipment entity within the shipment group;
co-locating and presenting the visual affordances representing each of the received location signals with a spatial alignment showing a separation distance of the shipment-related entities;
periodically receiving updated location signals from one or more of the shipment-related entities;
updating the presentation of the plurality of co-located visual affordances on the UI based on the updated location signals.

20. The method of claim 17, wherein the plurality of co-located visual affordances comprises a plurality of co-located dots, and the method further comprises:
providing a geographic mapping of the plurality of co-located dots on the UI;
comparing a present location of the co-located dots to at least one of an intended shipment delivery destination and a current expected location of the shipment;
identifying, based on the present location, if there has been a route deviation by the operator that is outside of an acceptable range of deviation from a pre-scheduled route; and
generating and transmitting at least one notification signal to correct the deviation.

21. The method of claim 17, wherein:
the plurality of co-located visual affordances comprises a plurality of co-located dots, each dot representing a location of a shipment-related entity as determined from a respective one of the received location signals; and
the method further comprises:
detecting an occurrence of an anomaly from among a group comprising (i) loss of reception of the location signals from one or more of the shipment-related entities, (ii) unscheduled changes in a spatial relationship of the shipment-related entities or corresponding visual affordances on the STUI, and (iii) an unscheduled movement of a shipment location signal from a shipment pick-up location before being co-located and grouped with an operator location signal, indicative of an unauthorized taking of shipment; and
in response to detecting an anomaly that includes an unscheduled separation of the co-located dots from each other before a shipment delivery at the intended destination:

determining if there is a valid reason for the unscheduled separation by evaluating historical data and received data about the shipment-related entities, the route, geographic location at which the unscheduled separation occurs, and received environmental conditions; and in response to not identifying a valid reason for the unscheduled separation: flagging the shipment for enhanced monitoring; triggering security measures to alert relevant parties of the occurrence of the anomaly; and creating and storing a record of the occurrence of the anomaly.

22. The method of claim 17, wherein to monitor for any unscheduled deviations, the method further comprises:
comparing a present geographic location of the visual affordance on a geographic location mapping to an expected geographic location, based on a prescribed route for the shipment; and identify whether there has been a route deviation by the operator;
monitoring for changes in an alignment pattern and separation distance of the visual affordances corresponding to each of the shipment-related entities within the shipment group, relative to an expected alignment and separation distance; and
monitoring for specific changes in a reception of the input location signals, which specific changes are indicative of an anomaly.

23. A mobile communication device comprising:
a display providing a user interface;
a memory having stored thereon a shipment location tracking utility (SLTU); and
a processor communicatively connected to the display and the memory and which executes the SLTU to enable the user communication device to:
track a series of dots corresponding to a shipment assigned to a driver for transporting to one or more respective destinations;
receive a location signal for each of the shipment and a tractor trailer;
present, within the user interface, a group of dots representing a relative co-location of each of the cargo and the tractor trailer;
automatically updating a relative location of each dot within the group to correlate to a current real-time location;
detect an unscheduled separation of the dots;
compare a separation distance to a pre-set threshold maximum separation distance;
determine when a detected separation distance of one of the tracking affordances is greater than the pre-set threshold maximum separation distance; and
in response to the detected separation distance being greater than the pre-set threshold maximum separation distance, generate and issue a notification signal to alert at least one of the operator and a remote monitoring device that an anomaly has been detected with the movement of the shipment that can affect a security of the shipment.

24. The mobile communication device of claim 23, wherein the SLTU further configures the user device to:
co-locate and group the unique tracking affordance with at least one of a second tracking affordance associated with the shipping vessel and a third tracking affordance associated with the user communication device, wherein a first unique tracking affordance of the user communication device corresponds to a location of an authorized operator.

25. The mobile communication device of claim 23, further comprising:
a wireless transceiver that supports wireless communication; and
wherein the SLTU configures the user communication device to:
receive a shipment assignment providing information about a shipment that is to be picked up and transported by the operator from a given shipment pick-up point to a shipment delivery point;
provide a unique tracking affordance corresponding to the shipment;
map the unique tracking affordance to a current location of the shipment on a co-location map presented on a tracking UI;
receive movement data associated with the unique tracking affordance and updating a mapping on a displayed co-location map;
monitor for anomalies in a current location of the shipment prior to the operator arriving at the origination point to receive the shipment; and
in response to detecting an anomaly in the current location, generate and issue a notification about the anomaly.

26. The mobile communication device of claim 23, wherein the SLTU configures the user communication device to:
detect an anomaly that involves the unique tracking affordance moving away from the origination point at a velocity, which indicates the shipment has been picked up by another moving vessel; and
in response to detecting the anomaly, transmitting a notification to a monitoring server about the disappearance to trigger tracking of a location of the shipment relative to known operators to identify whether one of the known operators has mistakenly taken the shipment.

27. The mobile communication device of claim 23, wherein the SLTU configures the user communication device to:
detect an anomaly that involves a disappearance of a plurality of the unique tracking affordances, wherein the location signals are no longer detectable; and
in response to detecting the disappearance, generating and issuing an alert indicating that the shipment appears to be under a jamming attack; and
transmitting, to at least a monitoring server, the notification with information about the disappearance of the signals.

* * * * *